United States Patent
Hagadorn et al.

(10) Patent No.: US 9,260,552 B2
(45) Date of Patent: *Feb. 16, 2016

(54) PROCESS TO PRODUCE POLYMERS FROM PYRIDYLDIAMIDO TRANSITION METAL COMPLEXES AND USE THEREOF

(71) Applicant: ExxonMobil Chemical Patents Inc., Baytown, TX (US)

(72) Inventors: John R. Hagadorn, Houston, TX (US); Liehpao O. Farng, Lawrenceville, NJ (US); Patrick J. Palafox, Pasadena, TX (US); Jian Yang, Houston, TX (US); Ian C. Stewart, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/515,810

(22) Filed: Oct. 16, 2014

(65) Prior Publication Data

US 2015/0141590 A1    May 21, 2015

Related U.S. Application Data

(60) Provisional application No. 61/904,551, filed on Nov. 15, 2013, provisional application No. 62/011,947, filed on Jun. 13, 2014.

(51) Int. Cl.
| | |
|---|---|
| *C08F 4/76* | (2006.01) |
| *C08F 210/16* | (2006.01) |
| *C10M 143/04* | (2006.01) |
| *C10M 143/00* | (2006.01) |
| *C10L 1/16* | (2006.01) |
| *C08F 4/64* | (2006.01) |
| *C08F 4/52* | (2006.01) |

(52) U.S. Cl.
CPC ............. *C08F 210/16* (2013.01); *C10L 1/1641* (2013.01); *C10M 143/00* (2013.01); *C10M 143/04* (2013.01); *C08F 4/52* (2013.01); *C08F 4/64148* (2013.01); *C08F 4/76* (2013.01); *C08F 2500/03* (2013.01); *C08F 2500/17* (2013.01); *C08F 2800/10* (2013.01); *C10M 2203/1025* (2013.01); *C10M 2205/022* (2013.01); *C10M 2205/024* (2013.01); *C10N 2230/02* (2013.01)

(58) Field of Classification Search
CPC .......... C08F 4/50; C08F 4/52; C08F 4/64148; C08F 210/16
USPC ......................................... 526/172, 161, 134
See application file for complete search history.

(56) References Cited

U.S. PATENT DOCUMENTS

| | | | |
|---|---|---|---|
| 3,551,336 A * | 12/1970 | Jacobson et al. ................. 585/12 |
| 4,540,753 A | 9/1985 | Cozewith et al. | |
| 4,666,619 A * | 5/1987 | Kresge et al. ................. 508/591 |
| 4,804,794 A | 2/1989 | Ver Strate et al. | |
| 5,391,617 A | 2/1995 | Olivier et al. | |
| 6,100,224 A | 8/2000 | Peiffer et al. | |
| 6,103,657 A | 8/2000 | Murray | |
| 6,110,880 A * | 8/2000 | Verstrate et al. ............. 508/591 |
| 6,900,321 B2 | 5/2005 | Boussie et al. | |
| 7,402,235 B2 * | 7/2008 | Huang ............................ 208/18 |
| 7,928,164 B2 * | 4/2011 | Jiang et al. .................... 525/191 |
| 7,973,116 B2 | 7/2011 | Hagadorn et al. | |
| 8,309,501 B2 * | 11/2012 | Kolb et al. ..................... 508/591 |
| 8,378,048 B2 * | 2/2013 | Kolb et al. ..................... 526/348 |
| 8,394,902 B2 | 3/2013 | Hagadorn et al. | |
| 8,486,878 B2 * | 7/2013 | Li Pi Shan et al. ........... 508/591 |
| 2002/0142912 A1 | 10/2002 | Boussie et al. | |
| 2002/0156279 A1 | 10/2002 | Boussie et al. | |
| 2004/0220050 A1 | 11/2004 | Frazier et al. | |
| 2007/0191607 A1 | 8/2007 | Solan et al. | |
| 2010/0022726 A1 | 1/2010 | Hagadorn et al. | |
| 2010/0227990 A1 * | 9/2010 | Kuhlman et al. ............. 526/170 |
| 2011/0224391 A1 | 9/2011 | Hagadorn et al. | |
| 2011/0301310 A1 * | 12/2011 | Hagadorn et al. ............ 526/172 |
| 2012/0028865 A1 * | 2/2012 | Datta et al. .................... 508/591 |
| 2012/0071616 A1 | 3/2012 | Hagadorn et al. | |
| 2013/0131294 A1 | 5/2013 | Hagadorn et al. | |

FOREIGN PATENT DOCUMENTS

| | | |
|---|---|---|
| EP | 0 638 611 | 2/1995 |
| WO | WO 02/38628 | 5/2002 |
| WO | WO 2005/095469 | 10/2005 |
| WO | WO 2006/036748 | 4/2006 |
| WO | WO 2007/067965 | 6/2007 |
| WO | WO 2010/037059 | 4/2010 |

OTHER PUBLICATIONS

U.S. Appl. No. 61/815,065, filed Apr. 23, 2013, Hagadorn et al.
U.S. Appl. No. 61/904,551, filed Nov. 15, 2013, Hagadorn et al.
Britovsek et al., "*The Search for New-Generation Olefin Polymerization Catalysts: Life Beyond Metallocenes*," Angewandte Chemie International Edition, Feb. 15, 1999, vol. 38, Issue 4, pp. 428-447.
Covitch, M. J., "*Olefin Copolymer Viscosity Modifiers,*" in Lubricant Additives, Chemistry and Applications, pp. 293-327, CRC Press, 2003.
Froese et al., "*Mechanism of Activation of a Hafnium Pyridyl-Amide Olefin Polymerization Catalyst: Ligand Modification by Monomer,*" J. Am. Chem. Soc. 2007, vol. 129, Issue 25, pp. 7831-7840.
Gibson et al., "*Advances in Non-Metallocene Olefin Polymerization Catalysis,*" Chemical Reviews 2003, vol. 103, Issue 1, pp. 283-315.
Guerin et al., "*Conformationally Rigid Diamide Complexes of Zirconium; Electron Deficient Analogues of Cp₂Zr,*" Organometallics, Dec. 24, 1996, vol. 15, Issue 26, pp. 5586-5590.

(Continued)

*Primary Examiner* — Rip A Lee

(74) *Attorney, Agent, or Firm* — Catherine L. Bell

(57) ABSTRACT

Processes to produce ethylene copolymers using pyridyldiamido transition metal complexes, a chain transfer agent, and an activator are disclosed.

40 Claims, No Drawings

(56) References Cited

OTHER PUBLICATIONS

Marsden et al., "*Literature Review of OCP Viscosity Modifers,*" Lub. Sci. 1989, 1, pp. 265-280.

McGuire Jr et al., "Platinum (II) Polypyridines: *A Tale of Two Axes,*" Coordination Chemistry Reviews, vol. 254, No. 21-22 (2010), pp. 2574-2583.

Stambaugh et al., "*Viscosity Index Improvers and Thickeners,*" Chemistry and Technology of Lubricants, $3^{rd}$ ed., Springer, 2010, pp. 153-187.

Valente et al., "*Coordinative Chain Transfer Polymerization,*" ACS Publications, Chemical Reviews, Feb. 7, 2013, vol. 113, Issue 5, pp. 3836-3857.

van Muers et al., "*Polyethylene Chain Growth on Zinc Catalyzed by Olefin Polymerization Catalysts: A Comparative Investigation of Highly Active Catalyst Systems across the Transition Series,*" J. Am. Chem. Soc. Jul. 13, 2005, vol. 127, Issue 27, pp. 9913-9923.

Vaughan et al., "*Industrial Catalysts for Alkene Polymerization,*" Polymer Science: A Comprehensive Reference, vol. 3, Chapter 20, pp. 657-672, 2012.

\* cited by examiner

PROCESS TO PRODUCE POLYMERS FROM PYRIDYLDIAMIDO TRANSITION METAL COMPLEXES AND USE THEREOF

PRIORITY CLAIM

This invention claims priority to and the benefit of U.S. Ser. No. 61/904,551 filed Nov. 15, 2013 and U.S. Ser. No. 62/011,947, filed Jun. 13, 2014.

FIELD OF INVENTION

The invention relates to a process to produce polymers from pyridyldiamido transition metal complexes and the use of such polymers as lubricant additives, such as viscosity modifiers.

BACKGROUND OF INVENTION

Pyridyl amines have been used to prepare Group 4 complexes which are useful transition metal components for use in the polymerization of alkenes, see for example US 2002/0142912; U.S. Pat. No. 6,900,321; and U.S. Pat. No. 6,103,657, where the ligands have been used in complexes in which the ligands are coordinated in a bidentate fashion to the transition metal atom.

WO 2005/095469 shows catalyst compounds that use tridentate ligands through two nitrogen atoms (one amido and one pyridyl) and one oxygen atom.

US 2004/0220050A1 and WO 2007/067965 disclose complexes in which the ligand is coordinated in a tridentate fashion through two nitrogen (one amido and one pyridyl) and one carbon (aryl anion) donors.

A key step in the activation of these complexes is the insertion of an alkene into the metal-aryl bond of the catalyst precursor (Froese, R. D. J. et al., J. Am. Chem. Soc. 2007, 129, pp. 7831-7840) to form an active catalyst that has both five-membered and a seven-membered chelate rings.

WO 2010/037059 discloses pyridine containing amines for use in pharmaceutical applications.

US 2010/0227990 A1 discloses ligands that bind to the metal center with a NNC donor set instead of an NNN or NNP donor set.

WO/0238628 A2 discloses ligands that bind to the metal center with a NNC donor set instead of an NNN or NNP donor set.

Guerin, F.; McConville, D. H.; Vittal, J. J. *Organometallics* 1996, 15, p. 5586 discloses a ligand family and group 4 complexes that use a NNN-donor set, but do not feature 7-membered chelate ring or either of dihydroindenyl- and tetrahydronaphthalenyl-groups.

U.S. Pat. No. 7,973,116, U.S. Pat. No. 8,394,902, US 2011-0224391, US 2011-0301310 A1, and U.S. Ser. No. 61/815,065, filed Apr. 23, 2013 disclose pyridylamido transition metal complexes that do not feature dihydroindenyl- or tetrahydronaphthalenyl-groups.

References of interest also include: 1) Vaughan, A; Davis, D. S.; Hagadorn, J. R. in Comprehensive Polymer Science, Vol. 3, Chapter 20, "Industrial catalysts for alkene polymerization"; 2) Gibson, V. C.; Spitzmesser, S. K. Chem. Rev. 2003, 103, 283; 3) Britovsek, G. J. P.; Gibson, V. C.; Wass, D. F. Angew. Chem. Int. Ed. 1999, 38, 428; 4) WO 2006/036748; 5) McGuire, R. et al. Coordination Chemistry Reviews, Vol 254, No. 21-22, pages 2574-2583 (2010); 6) U.S. Pat. No. 4,540,753; 7) U.S. Pat. No. 4,804,794; 8) P. Chem. Rev. 2013, 113, 3836-38-57; 9) J. Am. Chem. Soc. 2005, 127, 9913-9923; 10) Lub. Sci. 1989, 1, 265-280; 11) Lubricant Additives, Chemistry and Applications, pages 293-327, CRC Press, 2003; 12) Chemistry and Technology of Lubricants, 3rd edition, pages 153-187, Springer, 2010; 13) US2013-0131294.

U.S. Ser. No. 61/904,551, filed Nov. 15, 2013 discloses pyridyldiamide catalyst compositions that, the instant inventors have found, produce polymers useful in viscosity modification applications.

Lubrication fluids are applied between moving surfaces to reduce friction, thereby improving efficiency and reducing wear. Lubrication fluids also often function to dissipate the heat generated by moving surfaces.

One type of lubrication fluid is a petroleum-based lubrication oil used for internal combustion engines. Lubrication oils contain additives that help the lubrication oil to have a certain viscosity at a given temperature. In general, the viscosity of lubrication oils and fluids is inversely dependent upon temperature. When the temperature of a lubrication fluid is increased, the viscosity generally decreases, and when the temperature is decreased, the viscosity generally increases. For internal combustion engines, for example, it is desirable to have a lower viscosity at low temperatures to facilitate engine starting during cold weather, and a higher viscosity at higher ambient temperatures when lubrication properties typically decline.

Additives for lubrication fluids and oils include rheology modifiers, such as viscosity index (VI) improvers. VI improving components, many of which are derived from ethylene-alpha-olefin copolymers, modify the rheological behavior of a lubricant to increase viscosity and promote a more constant viscosity over the range of temperatures at which the lubricant is used. Higher ethylene content copolymers are thought to efficiently promote oil thickening and shear stability. However, higher ethylene content copolymers also tend to flocculate or aggregate in oil formulations leading to extremely viscous and, in the limit, solid formulations. Flocculation typically happens at ambient or subambient conditions of controlled and quiescent cooling. This deleterious property of otherwise advantageous higher ethylene content viscosity improvers is measured by low temperature solution rheology. Various remedies have been proposed for these higher ethylene content copolymer formulations to overcome or mitigate the propensity towards the formation of high viscosity flocculated materials.

It is anticipated that the performance of VI improvers can be substantially improved, as measured by the thickening efficiency (TE) and the shear stability index (SSI), by appropriate and careful manipulation of the structure of the VI improver.

One proposed solution is the use of blends of amorphous and semi-crystalline ethylene-based copolymers for lubricant oil formulations. The combination of two such ethylene-propylene copolymers allows for increased thickening efficiency, shear stability index, low temperature viscosity performance and pour point. See, e.g., U.S. Pat. Nos. 7,402,235 and 5,391,617, and European Patent 0 638,611, the disclosures of which are incorporated herein by reference.

There remains a need, however, for novel rheology modifier compositions comprised of ethylene and alpha-olefin-based comonomers suitable for use in VI improvers which have unexpectedly good high temperature thermal-oxidative stability, high temperature corrosion resistance, low frictional property, low cold crank viscosity, and low gelation property while still having excellent low temperature solution rheological properties. The present invention meets this and other needs.

SUMMARY OF INVENTION

This invention relates to an ethylene copolymer useful for viscosity modification applications, said copolymer having:

1) an Mw(LS)/Mn(DRI) of from 1 to 2.5;
2) an Mw of from 3,000 to 300,000 g/mol;
3) a g'vis of 0.90 or more;
4) an ethylene content of 35 to 85 mol % or more;
5) a content of one or more C3 to C20 comonomer(s) (such as alpha olefins) from 15 to 65 mol %;
6) a ratio of thickening efficiency to shear stability index of (30 cycles) 1:3 to 1:20;
7) a melting point (Tm) of 65° C. or less; and
8) a viscosity index of 150 or greater.

This invention also relates to a process to produce said copolymer comprising contacting ethylene and at least one C3 to C20 comonomer with a catalyst system comprising an activator, a chain transfer agent, and a pyridyldiamido transition metal complex represented by the formula (A), (B), (C) or (D):

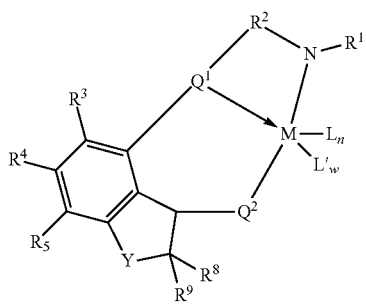

(A)

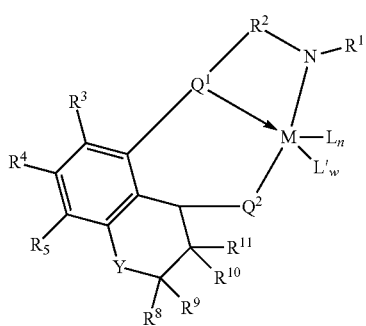

(B)

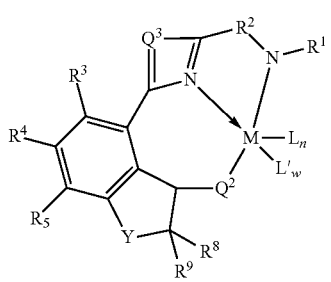

(C)

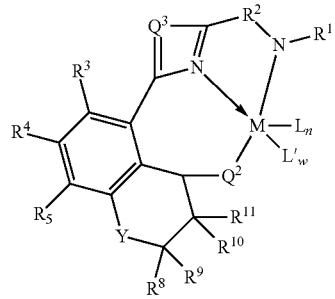

(D)

wherein:

M is a Group 3 or 4 metal;

$Q^1$ is a three atom bridge with the central of the three atoms being a group 15 or 16 element (said group 15 element may or may not be substituted with an $R^{30}$ group) that preferably forms a dative bond to M, preferably represented by the formula: $-G^1-G^2-G^3-$ where $G^2$ is a group 15 or 16 atom (said group 15 element may be substituted with an $R^{30}$ group), $G^1$ and $G^3$ are each a group 14, 15 or 16 atom (each group 14, 15 and 16 element may or may not be substituted with one or more $R^{30}$ groups), where $G^1$, $G^2$ and $G^3$, or $G^1$ and $G^2$, or $G^1$ and $G^3$, or $G^2$ and $G^3$ may form a singular or multi ring system, where each $R^{30}$ group is, independently, hydrogen or a $C_1$ to $C_{100}$ hydrocarbyl group or a silyl group;

$Q^2$ is $-NR^{17}$ or $-PR^{17}$, where $R^{17}$ is selected from hydrocarbyls, substituted hydrocarbyls, silyls, and germyls;

$Q^3$ is -(TT)- or -(TTT)- where each T is carbon or a heteroatom, preferably C, O, S, or N, and said carbon or heteroatom may be unsubstituted (e.g., hydrogen is bound to the carbon or heteroatom) or substituted with one or more $R^{30}$ groups that together with the "—C-$Q^3$=C—" fragment, forms a 5- or 6-membered cyclic group or a polycyclic group including the 5 or 6 membered cyclic group;

$R^1$ is selected from the group consisting of hydrocarbyls, and substituted hydrocarbyls, or silyl groups;

$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups ($R^3$ & $R^4$ and/or $R^4$ & $R^5$) may be joined to form a substituted or unsubstituted hydrocarbyl or heterocyclic ring, where the ring has 5, 6, 7, or 8 ring atoms and where substitutions on the ring can join to form additional rings;

$R^2$ is $-E(R^{12})(R^{13})-$ with E being carbon, silicon, or germanium;

Y is selected from oxygen, sulfur, and $-E^*(R^6)(R^7)-$, with $E^*$ being carbon, silicon, or germanium;

$R^6$, $R^7$, $R^8$, $R^9$, $R^{10}$, $R^{11}$, $R^{12}$, and $R^{13}$ are independently selected from the group consisting of hydrogen, hydrocarbyls, substituted hydrocarbyls, alkoxy, halogen, amino, and silyl, and wherein adjacent R groups ($R^6$ & $R^7$, and/or $R^8$ & $R^9$, and/or $R^9$ & $R^{10}$, and/or $R^{10}$ & RH and/or $R^{12}$ & $R^{13}$) may be joined to form a saturated, substituted or unsubstituted hydrocarbyl or heterocyclic ring, where the ring has 5, 6, 7, or 8 ring carbon atoms and where substitutions on the ring can join to form additional rings;

L is an anionic leaving group, where the L groups may be the same or different and any two L groups may be linked to form a dianionic leaving group;

n is 1 or 2;

L' is neutral Lewis base; and w is 0, 1, 2, 3 or 4.

This invention also relates to the process above where the ethylene, the one or more C3 to C20 comonomers, the activator, and the pyridyldiamido transition metal complex are contacted under polymerization conditions prior to addition of the chain transfer agent.

DETAILED DESCRIPTION

The specification describes transition metal complexes. The term complex is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization or oligomerization function using an activator which is believed to create a cation as a result of the removal of an anionic group, often referred to as a leaving group, from the transition metal.

As used herein, the numbering scheme for the Periodic Table groups is the new notation as set out in Chemical and Engineering News, 63(5), 27 (1985).

The following abbreviations are used through this specification: dme is 1,2-dimethoxyethane, Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, nBu is normal butyl, TMS is trimethylsilyl, TIBAL is triisobutylaluminum, TNOAL is tri(n-octyl)aluminum, MAO is methylalumoxane, p-Me is para-methyl, Bn is benzyl (i.e., $CH_2Ph$), THF (also referred to as thf) is tetrahydrofuran, RT is room temperature (and is 23° C. unless otherwise indicated), tol is toluene, EtOAc is ethyl acetate, and Cy is cyclohexyl.

The term "substituted" means that a hydrogen has been replaced with a heteroatom, a heteroatom containing group, or a hydrocarbyl group. For example, methyl-cyclopentadiene is substituted with a methyl group.

The terms "hydrocarbyl radical," "hydrocarbyl" and "hydrocarbyl group" are used interchangeably throughout this document. Likewise the terms "group", "radical", and "substituent" are also used interchangeably in this document. For purposes of this disclosure, "hydrocarbyl radical" is defined to be $C_1$-$C_{100}$ radicals, that may be linear, branched, or cyclic, and when cyclic, aromatic or non-aromatic.

Substituted hydrocarbyl radicals are radicals in which at least one hydrogen atom of the hydrocarbyl radical has been substituted with at least one functional group such as $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$, and the like, or where at least one heteroatom has been inserted within a hydrocarbyl ring.

The term "catalyst system" is defined to mean a complex/activator pair. When "catalyst system" is used to describe such a pair before activation, it means the unactivated catalyst complex (precatalyst) together with an activator and, optionally, a co-activator. When it is used to describe such a pair after activation, it means the activated complex and the activator or other charge-balancing moiety. The transition metal compound may be neutral as in a precatalyst, or a charged species with a counter ion as in an activated catalyst system.

Complex, as used herein, is also often referred to as catalyst precursor, precatalyst, catalyst, catalyst compound, transition metal compound, or transition metal complex. These words are used interchangeably. Activator and cocatalyst are also used interchangeably.

A scavenger is a compound that is typically added to facilitate polymerization by scavenging impurities. Some scavengers may also act as chain transfer agents. Some scavengers may also act as activators and may be referred to as co-activators. A co-activator, that is not a scavenger, may also be used in conjunction with an activator in order to form an active catalyst. In some embodiments, a co-activator can be pre-mixed with the transition metal compound to form an alkylated transition metal compound. Examples of scavengers include, but are not limited to, trialkylaluminums, methylalumoxanes, modified methylalumoxanes, MMAO-3A (Akzo Nobel), bis(diisobutylaluminum)oxide (Akzo Nobel), tri(n-octyl)aluminum, triisobutylaluminum, and diisobutylaluminum hydride.

Noncoordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer, can displace it from the catalyst center. Any metal or metalloid that can form a compatible, weakly coordinating complex may be used or contained in the noncoordinating anion. Suitable metals include, but are not limited to, aluminum, gold, and platinum. Suitable metalloids include, but are not limited to, boron, aluminum, phosphorus, and silicon. A stoichiometric activator can be either neutral or ionic. The terms ionic activator and stoichiometric ionic activator can be used interchangeably. Likewise, the terms neutral stoichiometric activator and Lewis acid activator can be used interchangeably. The term non-coordinating anion includes neutral stoichiometric activators, ionic stoichiometric activators, ionic activators, and Lewis acid activators.

For purposes herein, an "olefin," alternatively referred to as "alkene," is a linear, branched, or cyclic compound comprising carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have a "propylene" content of 35 wt % to 55 wt %, it is understood that the mer unit in the copolymer is derived from propylene in the polymerization reaction and said derived units are present at 35 wt % to 55 wt %, based upon the weight of the copolymer.

For purposes herein a "polymer" has two or more of the same or different "mer" units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically. Accordingly, the definition of copolymer, as used herein, includes terpolymers and the like. An oligomer is typically a polymer having a low molecular weight, such as an Mn of less than 25,000 g/mol, or in an embodiment less than 2,500 g/mol, or a low number of mer units, such as 75 mer units or less or 50 mer units or less. An "ethylene polymer" or "ethylene copolymer" is a polymer or copolymer comprising at least 35 mole % ethylene derived units.

Unless otherwise noted, all molecular weights units (e.g., Mw, Mn, Mz) are g/mol.

Unless otherwise noted, all melting points ($T_m$) are DSC second melt.

The term "aryl" or "aryl group" means a six carbon aromatic ring and the substituted variants thereof, including but not limited to, phenyl, 2-methyl-phenyl, xylyl, 4-bromo-xylyl. Likewise, heteroaryl means an aryl group where a ring carbon atom (or two or three ring carbon atoms) has been replaced with a heteroatom, preferably N, O, or S.

The term "ring atom" means an atom that is part of a cyclic ring structure. By this definition, a benzyl group has six ring atoms and tetrahydrofuran has 5 ring atoms.

A "ring carbon atom" is a carbon atom that is part of a cyclic ring structure. By this definition, a benzyl group has six ring carbon atoms and para-methylstyrene also has six ring carbon atoms.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

The term "continuous" means a system that operates without interruption or cessation. For example, a continuous process to produce a polymer would be one where the reactants are continually introduced into one or more reactors and polymer product is continually withdrawn.

The term "pyridyldiamido complex" or "pyridyldiamide complex" or "pyridyldiamido catalyst" or pyridyldiamide catalyst" refers to a class of coordination complexes described in U.S. Pat. No. 7,973,116B2, US 2012/0071616A1, US 2011/0224391A1, and US 2011/0301310A1 that feature a dianionic tridentate ligand that is coordinated to a metal center through one neutral Lewis basic donor atom (e.g., a pyridine group) and a pair of anionic amido or phosphido (i.e., deprotonated amine or phosphine) donors. In these complexes the pyridyldiamido ligand is coordinated to the metal with the formation of one five membered chelate ring and one seven membered chelate ring. It is possible for additional atoms of the pyridyldiamido ligand to be coordinated to the metal without affecting the catalyst function upon activation; an example of this could be a cyclometalated substituted aryl group that forms an additional bond to the metal center.

A solution polymerization means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, Ind. Eng, Chem. Res. 29, 2000, 4627.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, preferably less than 10 wt %, preferably less than 1 wt %, preferably 0 wt %.

PAO-10 is a polyalphaolefin available from ExxonMobil Chemical Company, Houston, Tex. under the tradename SpectraSyn™ 10 and having the typical properties of:

|  | KV @ 100° C., cSt | KV @ 40° C., cSt | VI | Pour Point,[1] ° C. | Specific gravity[2] | Flash Point,[3] ° C. | APHA[4] Color |
|---|---|---|---|---|---|---|---|
| SpectraSyn 10 | 10 | 66 | 137 | −48 | 0.835 | 266 | 10 |

[1]ASTM D97;
[2]ASTM D4052 (15.6, 15.6° C.);
[3]ASTM D92;
[4]ASTM D1209

This invention relates to ethylene copolymers, preferably an ethylene propylene copolymers, useful for viscosity modification applications, said copolymer having:

1) an Mw(LS)/Mn(Dri) of from 1 to 2.5 (preferably from 1 to 2.0, preferably from 1 to 1.75, preferably from 1.05 to 1.50);

2) an Mw (LS) of from 3,000 to 300,000 g/mol (preferably from 50,000 to 200,000 g/mol, preferably 75,000 to 125,000 g/mol);

3) a g'vis of 0.90 or more (preferably 0.95 or more, preferably 0.98 or more), 4) an ethylene content of 35 mol % to 85 mol % (preferably 40 to 80 mole %, preferably 60 to 75 mol %);

5) a C3 to C20 comonomer(s) (such as alpha-olefins) content of from 15 to 65 mol % (preferably 20 to 60 mol %, preferably 25 to 40 mol %);

6) a ratio of thickening efficiency to shear stability index (30 cycles) of 1:3 to 1:20 (preferably 1:4 to 1:18, preferably 1:5 to 1:15);

7) a melting point (Tm) of 65° C. or less (preferably 55° C. or less, preferably 45° C. or less, preferably 10° C. or less); and 8) a viscosity index of 150 or greater (preferably 170 or more, preferably 200 or more, preferably 220 or more).

Further, this invention also relates to an ethylene copolymer having a ratio of thickening efficiency to lubricating oil viscosity (KV100) of 2:1 or more (preferably 2.1:1 or greater, preferably 2.2:1 or greater, preferably 3:1 or more), when 1 wt % of the ethylene copolymer is added to a lubricating oil, such a basestock having a KV100 of 10 cSt.

Further, this invention also relates to an ethylene copolymer having a thickening efficiency of 2 or more (preferably 2.1 or more, preferably 2.2 or more, preferably 3 or more).

Further, this invention also relates to an ethylene copolymer having a shear stability index at 30 cycles of less than 50, (preferably less than 40, preferably less than 36).

Further, this invention also relates to an ethylene copolymer having a shear stability index at 90 cycles of less than 60, (preferably less than 50, preferably less than 40, preferably less than 30).

In an aspect of the invention, the copolymers useful herein are copolymers comprising from 35 to 85 mol % ethylene (preferably 40 to 80 mol %, preferably 60 to 75 mol %) and from 15 to 65 mol % (preferably 20 to 60 mol %, preferably 25 to 40 mol %) of one or more C3 to C20 comonomers, preferably C3 to C20 alpha olefins, preferably one or more of methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and isomers thereof, preferably propylene.

Preferred ethylene copolymers include copolymers comprising at least 60 mol % ethylene, and having up to 40 mol %, preferably 1 to 39 mol %, preferably 15 to 35 mol %, preferably 20 to 30 mol % of a C3-C20 comonomer, methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and isomers thereof, preferably propylene.

In another embodiment of the invention, the ethylene copolymers described herein have a viscosity at 60° C. of greater than 1000 cP, greater than 12,000 cP, or greater than 100,000 cP. In other embodiments, the ethylene copolymers have a viscosity of less than 200,000 cP, less than 150,000 cP, or less than 100,000 cP. Viscosity is defined as resistance to flow and the melt viscosity of neat copolymers is measured at elevated temperature using a Brookfield Digital Viscometer.

In another embodiment of the invention, the ethylene copolymers described herein also have a viscosity (also referred to as a Brookfield Viscosity) of 90,000 mPa·sec or less at 190° C. (as measured by ASTM D 3236 at 190° C.); or 80,000 or less, or 70,000 or less, or 60,000 or less, or 50,000 or less, or 40,000 or less, or 30,000 or less, or 20,000 or less, or 10,000 or less, or 8,000 or less, or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec, and/or a viscosity of 8000 mPa·sec or less at 160° C. (as measured by ASTM D 3236 at 160° C.); or 7000 or less, or 6000 or less, or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec.

In another embodiment of the invention, the ethylene copolymers described herein also have a viscosity index (VI), as determined by ASTM 2270 of 150 or greater, preferably 170 or more, preferably 200 or more, preferably 220 or more.

In another embodiment of the invention, the ethylene copolymers described herein also have a kinematic viscosity at 100° C. (KV100), as measured by ASTM 445, of 20 cSt or greater, preferably 50 cSt or greater; preferably 120 cSt or greater, preferably 200 cSt or greater.

In another embodiment of the invention, the ethylene copolymers described herein also have a kinematic viscosity at 40° C. (KV40), as measured by ASTM 445, of 60 cSt or greater, preferably 70 cSt or greater; preferably 90 cSt or greater.

In another embodiment of the invention, the ethylene copolymers described herein do not increase the color of the lubricant (such as PAO-10) by more than 1 unit (preferably 0.5, preferably 0 units), as measured by ASTM 1500, when added at 2 wt %. Preferably the ethylene copolymer is added to a lube oil (mineral or synthetic oil, such as PAO-10) at 2 wt %, and the color of the oil does not increase the color rating for more than 1 unit, preferably no more than 0.5 unit and more preferably no change of color at all.

In another embodiment, when 1 wt % of the ethylene copolymer is added to a lubricating composition, the viscosity (KV100) increases by at least 50%, preferably at least 100%, preferably at least 200%, preferably by at least 500%.

This invention further relates to a process to produce the ethylene copolymers described herein comprising contacting ethylene and at least one C3 to C20 comonomer with a catalyst system comprising an activator, a chain transfer agent (which may be a material that can function as both a scavenger and a chain transfer agent, such as tri(n-octyl) aluminum) and a pyridyldiamido transition metal complex represented by the formula (A), (B), (C) or (D):

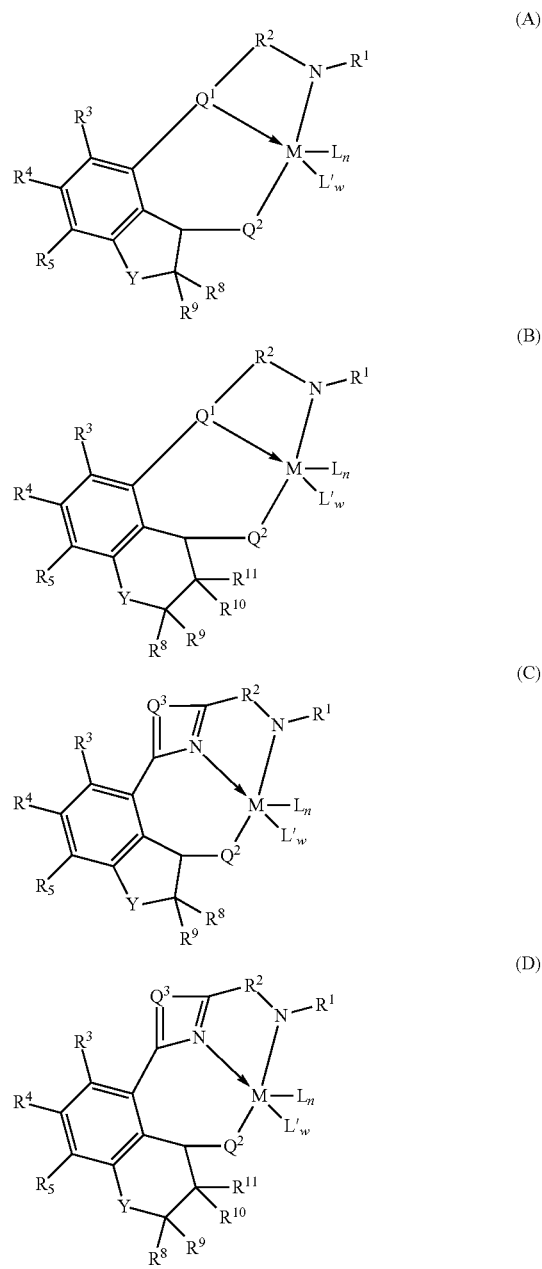

wherein:

M is a Group 3 or 4 metal;

$Q^1$ is a three atom bridge with the central of the three atoms being a group 15 or 16 element (said group 15 element may or may not be substituted with an $R^{30}$ group) that preferably forms a dative bond to M, preferably represented by the formula: -G¹-G²-G³- where G² is a group 15 or 16 atom (said group 15 element may be substituted with an $R^{30}$ group), $G^1$ and $G^3$ are each a group 14, 15 or 16 atom (each group 14, 15 and 16 element may or may not be substituted with one or more $R^{30}$ groups), where $G^1$, $G^2$ and $G^3$, or $G^1$ and $G^2$, or $G^1$ and $G^3$, or $G^2$ and $G^3$ may form a singular or multi ring system, where each $R^{30}$ group is, independently, hydrogen or a $C_1$ to $C_{100}$ hydrocarbyl group or a silyl group;

$Q^2$ is —$NR^{17}$, —$PR^{17}$, or oxygen, where $R^{17}$ is selected from hydrogen, hydrocarbyls, substituted hydrocarbyls, silyls, and germyls;

$Q^3$ is -(TT)- or -(TTT)- where each T is carbon or a heteroatom, preferably C, O, S, or N, and said carbon or heteroatom may be unsubstituted (e.g., hydrogen is bound to the carbon or heteroatom) or substituted with one or more $R^{30}$ groups that together with the "—C-$Q^3$=C—" fragment, forms a 5- or 6-membered cyclic group or a polycyclic group including the 5 or 6 membered cyclic group;

$R^1$ is selected from the group consisting of hydrocarbyls, and substituted hydrocarbyls, or silyl groups;

$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups ($R^3$ & $R^4$ and/or $R^4$ & $R^5$) may be joined to form a substituted or unsubstituted hydrocarbyl or heterocyclic ring, where the ring has 5, 6, 7, or 8 ring atoms and where substitutions on the ring can join to form additional rings;

$R^2$ is -E($R^{12}$)($R^{13}$)— with E being carbon, silicon, or germanium;

Y is selected from oxygen, sulfur, and -E*($R^6$)($R^7$)—, with E* being carbon, silicon, or germanium;

$R^6$, $R^7$, $R^8$, $R^9$, $R^{10}$, $R^{11}$, $R^{12}$, and $R^{13}$ are independently selected from the group consisting of hydrogen, hydrocarbyls, substituted hydrocarbyls, alkoxy, halogen, amino, and silyl, and wherein adjacent R groups ($R^6$ & $R^7$, and/or $R^8$ & $R^9$, and/or $R^9$ & $R^{10}$, and/or $R^{10}$ & $R^{11}$ and/or $R^{12}$ & $R^{13}$) may be joined to form a saturated, substituted or unsubstituted hydrocarbyl or heterocyclic ring, where the ring has 5, 6, 7, or 8 ring carbon atoms and where substitutions on the ring can join to form additional rings;

L is an anionic leaving group, where the L groups may be the same or different and any two L groups may be linked to form a dianionic leaving group;

n is 0, 1, 2, 3, or 4;

L' is neutral Lewis base; and w is 0, 1, 2, 3 or 4.

This invention also relates to the process above where the ethylene, the one or more C3 to C20 comonomers, the activator, and the pyridyldiamido transition metal complex are contacted under polymerization conditions prior to addition of the chain transfer agent. In an embodiment of the invention, the polymerization is performed in two stages, with the chain transfer agent being introduced in the second stage. The two stages may be two continuous stirred tank reactors connected in series or the two stages may be different zones of a tubular reactor. Alternatively, the two stages may be earlier and later times during a polymerization conducted in a stirred reactor or in a batch process.

Pyridyldiamido Transition Metal Complex

Pyridyldiamido transition metal complexes useful herein include those represented by the general formula: (A), (B), (C), or (D):

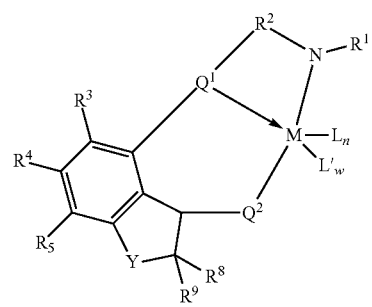
(A)

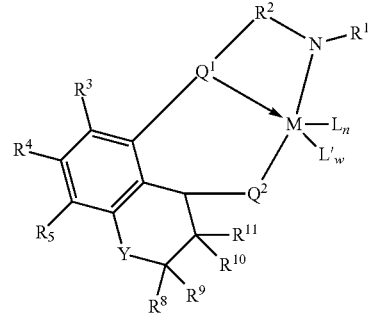
(B)

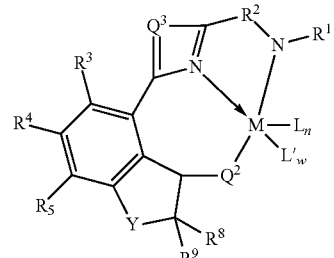
(C)

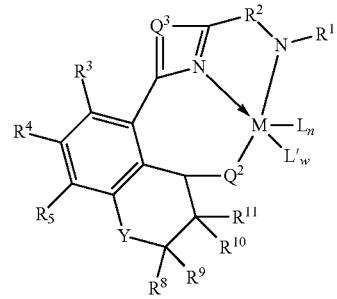
(D)

wherein:

M is a Group 3 or 4 metal (preferably a Group 4 metal, preferably Ti, Zr or Hf);

$Q^1$ is a three atom bridge with the central of the three atoms being a group 15 or 16 element (said group 15 element may or may not be substituted with an $R^{30}$ group) that preferably forms a dative bond to M, preferably represented by the formula: -G¹-G²-G³- where G² is a group 15 or 16 atom (said group 15 element may be substituted with a $R^{30}$ group), $G^1$ and $G^3$ are each a group 14, 15 or 16 atom (each group 14, 15 and 16 element may or may not be substituted with one or more $R^{30}$ groups), where $G^1$, $G^2$ and $G^3$, or $G^1$ and $G^2$, or $G^1$ and $G^3$, or $G^2$ and $G^3$ may form a singular or multi ring system, where each $R^{30}$ group is, independently, hydrogen or a $C_1$ to $C_{100}$ hydrocarbyl group or a silyl group;

$Q^2$ is —$NR^{17}$, —$PR^{17}$, or oxygen, where $R^{17}$ is selected from hydrogen, hydrocarbyls, substituted hydrocarbyls, silyl and germyl;

$Q^3$ is -(TT)- or -(TTT)- where each T is carbon or a heteroatom (preferably C, O, S, or N), and said carbon or heteroatom may or may not be substituted with one or more $R^{30}$ groups that together with the "—C-$Q^3$=C—" fragment, forms a 5- or 6-membered cyclic group or a polycyclic group including the 5 or 6 membered cyclic group;

$R^1$ is selected from the group consisting of hydrocarbyls, and substituted hydrocarbyls, or silyl groups;

$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups ($R^3$ & $R^4$ and/or $R^4$ & $R^5$) may be joined to form a substituted or unsubstituted hydrocarbyl or heterocyclic ring, where the ring has 5, 6, 7, or 8 ring atoms and where substitutions on the ring can join to form additional rings;

$R^6$, $R^7$, $R^8$, $R^9$, $R^{10}$, $R^{11}$, $R^{12}$, and $R^{13}$ are independently selected from the group consisting of hydrogen, hydrocarbyls, substituted hydrocarbyls, alkoxy, halogen, amino, and silyl, and wherein adjacent R groups ($R^6$ & $R^7$, and/or $R^8$ & $R^9$, and/or $R^9$ & $R^{10}$, and/or $R^{10}$ & RH and/or $R^{12}$ & $R^{13}$) may be joined to form a saturated, substituted or unsubstituted hydrocarbyl or heterocyclic ring, where the ring has 5, 6, 7, or 8 ring carbon atoms and where substitutions on the ring can join to form additional rings;

$R^2$ is -E($R^{12}$)($R^{13}$)—, with E being carbon, silicon, or germanium (preferably carbon or silicon, preferably carbon) and $R^{12}$ and $R^{13}$ as described above;

Y is selected from oxygen, sulfur, and -E*($R^6$)($R^7$)—, with E* being carbon, silicon, or germanium (preferably carbon or silicon, preferably carbon) and $R^6$ and $R^7$ as described herein;

L is an anionic leaving group, where the L groups may be the same or different and any two L groups may be linked to form a dianionic leaving group;

n is 0, 1, 2, 3, or 4 (preferably 2);

L' is neutral Lewis base; and w is 0, 1, 2, 3 or 4 (preferably 0 or 1).

In an embodiment of the invention, $Q^1$ is one of the following:

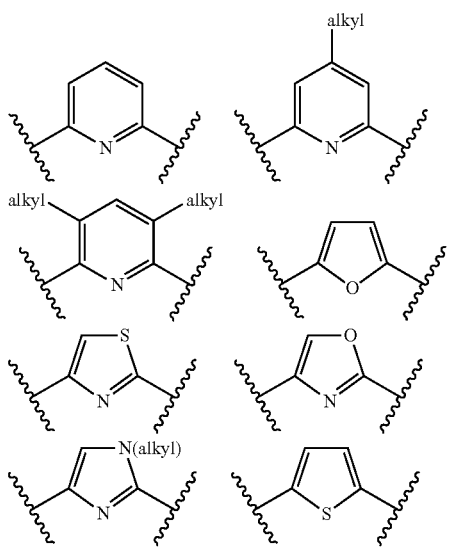

-continued

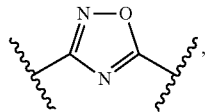

where the ⌇ symbols indicate the connections to $R^2$ and the aromatic ring, and alkyl is an alkyl group, such as a $C_1$ to $C_{20}$ alkyl group, such as methyl, ethyl, propyl, butyl, pentyl, hexyl, heptyl, octyl, nonyl, decyl, undecyl, or dodecyl.

In an embodiment of the invention, $G^1$ is carbon, nitrogen, oxygen, silicon, or sulfur, preferably carbon.

In an embodiment of the invention, $G^2$ is nitrogen, phosphorous, oxygen, sulfur, or selenium, preferably nitrogen, oxygen, or sulfur.

In an embodiment of the invention, $G^3$ is carbon, nitrogen, oxygen, silicon, or sulfur, preferably carbon.

In an embodiment of the invention, $Q^2$ is $NR^{17}$, $PR^{17}$, or oxygen, preferably $NR^{17}$.

In an embodiment of the invention, $Q^3$ is CHCHCH, CHCH, CHN(alkyl), CH—S, CHC(alkyl)CH, C(alkyl)CHC(alkyl), CH—O, NO, preferably CHCHCH, CHCH, CHN (alkyl), CHN(Me), CH—S, preferably the alkyl is a $C_1$ to $C_{20}$ alkyl, such as methyl, ethyl, propyl, butyl, pentyl, hexyl, heptyl, octyl, nonyl, decyl, undecyl, or dodecyl.

In an embodiment of the invention, $R^1$ is selected from the group consisting of hydrocarbyls, substituted hydrocarbyls, and silyl groups (preferably alkyl, aryl, heteroaryl, and silyl groups, preferably methyl, ethyl, propyl, butyl, pentyl, hexyl, heptyl, octyl, nonyl, decyl, undecyl, dodecyl, phenyl, substituted phenyl, 2,6-disubstitutedphenyl, 2,6-diisopropylphenyl, 2,4-6-trisubstituted aryl, 2,4,6-triisopropylphenyl, and isomers thereof, including cyclohexyl).

In an embodiment of the invention, $R^{17}$ is selected from the group consisting of hydrogen, hydrocarbyls, substituted hydrocarbyls, silyl, and germyl groups (preferably alkyl, aryl, heteroaryl, and silyl groups, preferably methyl, ethyl, propyl, butyl, pentyl, hexyl, heptyl, octyl, nonyl, decyl, undecyl, dodecyl, cycloalkyl, cyclooctyl, cyclododecyl, phenyl, substituted phenyl, 2-substituted phenyl, ortho-tolyl, 2,6-disubstitutedphenyl, and isomers thereof, including cyclohexyl).

In an embodiment of the invention, $R^{30}$ is selected from the group consisting of hydrogen, $C_{1-100}$ hydrocarbyls, and silyl groups (preferably alkyl, aryl, and silyl groups, preferably methyl, ethyl, propyl, butyl, pentyl, hexyl, heptyl, octyl, nonyl, decyl, undecyl, dodecyl, phenyl, and isomers thereof, including cyclohexyl).

In an embodiment of the invention, $R^2$ contains 1 to 20 carbons, preferably $R^2$ is selected from $CH_2$, CH(aryl), CH(2-isopropylphenyl), CH(2,6-dimethylphenyl), CH(2,4-6-trimethylphenyl), CH(alkyl), $CMe_2$, $SiMe_2$, $SiEt_2$, and $SiPh_2$.

In an embodiment of the invention, E and E* are, independently, carbon, silicon, or germanium (preferably carbon or silicon, preferably carbon). In a preferred embodiment of the invention, E and E* are both carbon.

In an embodiment of the invention, each $R^{12}$, $R^{13}$, $R^6$ and $R^7$ is independently selected from the group consisting of hydrogen, hydrocarbyl, and substituted hydrocarbyl, alkoxy, silyl, amino, aryloxy, halogen, and phosphino (preferably hydrogen, alkyl, aryl, alkoxy, silyl, amino, aryloxy, heteroaryl, halogen, and phosphino), $R^{12}$ and $R^{13}$ and/or $R^6$ and $R^7$ may be joined to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ and/or $R^6$ and $R^7$ may be joined to form a saturated heterocyclic ring, or a saturated substituted heterocyclic ring where substitutions on the ring can join to form additional rings.

In an embodiment of the invention, at least one of $R^{12}$ and $R^{13}$ is a $C_1$ to $C_{100}$ (preferably $C_6$ to $C_{40}$, preferably $C_7$ to $C_{30}$, preferably $C_8$ to $C_{20}$) substituted or unsubstituted hydrocarbyl group (preferably aryl, phenyl, substituted phenyl, alkyl or aryl substituted phenyl, $C_2$ to $C_{30}$ alkyl or aryl substituted phenyl, 2-substituted phenyl, 2-isopropylphenyl, 2,4,6-trimethylphenyl, and the like).

In an embodiment of the invention, at least one of $R^6$ and $R^7$ is a $C_1$ to $C_{100}$ (preferably $C_6$ to $C_{40}$, preferably $C_7$ to $C_{30}$, preferably $C_8$ to $C_{20}$) substituted or unsubstituted hydrocarbyl group (preferably aryl, phenyl, substituted phenyl, alkyl or aryl substituted phenyl, $C_2$ to $C_{30}$ alkyl or aryl substituted phenyl, 2-substituted phenyl, 2-isopropylphenyl, 2,4,6-trimethylphenyl, and the like).

In an embodiment of the invention, $R^3$, $R^4$, and $R^5$ are independently selected from the group consisting of hydrogen, hydrocarbyls, substituted hydrocarbyls, alkoxy, aryloxy, halogen, amino, and silyl, (preferably hydrogen, alkyl, alkoxy, aryloxy, halogen, amino, silyl, and aryl), and wherein adjacent R groups ($R^3$ & $R^4$ and/or $R^4$ & $R^5$) may be joined to form a substituted or unsubstituted hydrocarbyl or heterocyclic ring, where the ring has 5, 6, 7, or 8 ring atoms and where substitutions on the ring can join to form additional rings, preferably $R^3$, $R^4$, and $R^5$ are independently selected from the group consisting of hydrogen, methyl, ethyl, propyl, butyl, pentyl, hexyl, heptyl, octyl, nonyl, decyl, undecyl, dodecyl, phenyl, substituted phenyl, and isomers thereof.

In an embodiment of the invention, $R^8$, $R^9$, $R^{10}$, and $R^{11}$ are independently selected from the group consisting of hydrogen, hydrocarbyls, substituted hydrocarbyls, alkoxy, halogen, amino, and silyl, and the pairs of positions, and wherein adjacent R groups ($R^8$ & $R^9$, and/or $R^9$ & $R^{10}$, and/or $R^{10}$ & $R^{11}$) may be joined to form a saturated, substituted or unsubstituted hydrocarbyl or heterocyclic ring, where the ring has 5, 6, 7, or 8 ring carbon atoms and where substitutions on the ring can join to form additional rings, preferably $R^8$, $R^9$, $R^{10}$, and $R^{11}$ are independently selected from the group consisting of hydrogen, methyl, ethyl, propyl, butyl, pentyl, hexyl, heptyl, octyl, nonyl, decyl, undecyl, dodecyl, phenyl, substituted phenyl, and isomers thereof.

Preferably, any of the R groups above and other R groups mentioned hereafter, contain up to 30 carbon atoms, preferably no more than 30 carbon atoms, especially from 2 to 20 carbon atoms.

Preferably, M is Ti, Zr, or Hf and/or E and/or E* is carbon, with Zr or Hf based complexes being especially preferred.

In an embodiment of the invention, $R^1$ and $R^{17}$ may be independently selected from phenyl groups that are variously substituted with between zero to five substituents that include F, Cl, Br, I, $CF_3$, $NO_2$, alkoxy, dialkylamino, aryl, and alkyl groups with between one to ten carbons.

In an embodiment of the invention, each L may be independently selected from halide, alkyl, aryl, alkoxy, amido, hydrido, phenoxy, hydroxy, silyl, allyl, alkenyl, triflate, alkylsulfonate, arylsulfonate, and alkynyl. The selection of the leaving groups depends on the synthesis route adopted for arriving at the complex and may be changed by additional reactions to suit the later activation method in polymerization. For example, alkyl is preferred when using non-coordinating anions such as N,N-dimethylanilinium tetrakis(pentafluorophenyl)-borate or tris(pentafluorophenyl)borane. In another embodiment, two L groups may be linked to form a dianionic leaving group, for example, oxalate.

In another embodiment of the invention, each L' is independently selected from the group consisting of ethers, thioethers, amines, nitriles, imines, pyridines, and phosphines, preferably ethers.

In any embodiment of the invention described herein, M is preferably a Group 4 metal, preferably Zr or Hf.

In any embodiment of the invention described herein, E and/or E* is preferably carbon.

Preferably, in any embodiment of the invention described herein, $R^6$ and $R^7$ are the same.

In any embodiment of the invention described herein, R', $R^3$, $R^4$, $R^5$, and $R^{17}$ may each contain no more than 30 carbon atoms.

In any embodiment of the invention described herein, E is carbon and $R^1$ and $R^{17}$ are independently selected from phenyl groups that are substituted with 0, 1, 2, 3, 4, or 5 substituents selected from the group consisting of F, Cl, Br, I, $CF_3$, $NO_2$, alkoxy, dialkylamino, hydrocarbyl, and substituted hydrocarbyls groups with from one to ten carbons.

In a preferred embodiment of the invention, the pyridyldiamido transition metal complex is represented by the Formula (A) above and at least one of $R^6$ and $R^7$ is a group containing from 1 to 100 (preferably 6 to 40, preferably 7 to 30) carbons.

In a preferred embodiment of the invention, the pyridyldiamido transition metal complex is represented by the Formula (A) above, and M is a Group 4 metal preferably Zr or Hf, preferably Hf.

In a preferred embodiment of the invention, the pyridyldiamido transition metal complex is represented by the Formula (B) above, and M is a Group 4 metal preferably Zr or Hf, preferably Hf.

In a preferred embodiment of the invention, the pyridyldiamido transition metal complex is represented by the Formula (A) above, and $G^2$ is oxygen, and $G^1$ and $G^3$ are carbon atoms that are joined to each other by two to six additional atoms to form a cyclic structure.

In a preferred embodiment of the invention, the pyridyldiamido transition metal complex is represented by the Formula (B) above, and $G^2$ is oxygen, and $G^1$ and $G^3$ are carbon atoms that are joined to each other by two to six additional atoms to form a cyclic structure.

In a preferred embodiment of the invention, the pyridyldiamido transition metal complex is represented by the Formula (A) above, and $G^2$ is nitrogen, and $G^1$ and $G^3$ are carbon atoms that are joined to each other by two to six additional atoms to form a cyclic structure.

In a preferred embodiment of the invention, the pyridyldiamido transition metal complex is represented by the Formula (B) above, and $G^2$ is nitrogen, and $G^1$ and $G^3$ are carbon atoms that are joined to each other by two to six additional atoms to form a cyclic structure.

In a preferred embodiment of the invention, the pyridyldiamido transition metal complex is represented by the Formula (A) above, and $G^2$ is sulfur, and $G^1$ and $G^3$ are carbon atoms that are joined to each other by two to six additional atoms to form a cyclic structure.

In a preferred embodiment of the invention, the pyridyldiamido transition metal complex is represented by the Formula (B) above, and $G^2$ is sulfur, and $G^1$ and $G^3$ are carbon atoms that are joined to each other by two to six additional atoms to form a cyclic structure.

In a preferred embodiment of the invention, the pyridyldiamido transition metal complex is represented by the Formula (C) above, and $Q^3$ is C(H)C(H)C(H), $R^1$ is 2,6-diisopropylphenyl, and $R^{17}$ is phenyl.

In a preferred embodiment of the invention, the pyridyl-diamido transition metal complex is represented by the Formula (D) above, $R^6$ is H, $R^7$ is a group containing between 1 to 100 (preferably 6 to 40, preferably 7 to 30) carbons, M is a Group 4 metal (preferably Zr or Hf, preferably Hf), and E is carbon.

In a preferred embodiment of the invention, the pyridyl-diamido transition metal complex is represented by the Formula (A) above, and $R^1$ is a 2,6-disubstituted aryl group where the substituents are selected from isopropyl, 3-pentyl, or cyclic aliphatic hydrocarbons containing between 4-20 carbons.

In a preferred embodiment of the invention, the pyridyl-diamido transition metal complex is represented by the Formula (A) above, and $Q^1$ is three atoms of a pyridine, imidazole, tetrahydrofuran, dioxane, dihydrothiazole, oxathiolane, tetrahydropyran, dihydrooxazole, or phosphinine group that is substituted at the adjacent positions.

In a preferred embodiment of the invention, the pyridyl-diamido transition metal complex is represented by the Formula (A) above, and $R^2$ is CH(aryl) with the aryl group containing between 7 and 20 carbon atoms.

Catalyst compounds useful herein include those represented by the formulae:

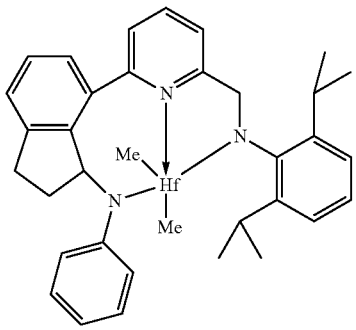

1

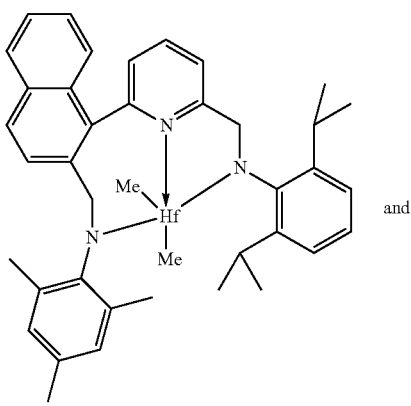

2 and

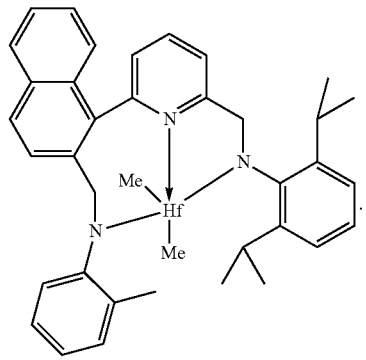

3

In another aspect of the invention, there are provided various processes for synthesizing the complexes described herein.

The pyridyl diamine ligands described herein are generally prepared in multiple steps. One key step involves the preparation of a suitable "linker" group(s) containing both an aryl boronic acid (or acid ester) and an amine group. Examples of these include compounds of the general formula: 7-(boronic acid)-2,3-dihydro-1H-inden-1-(amine), 7-(boronic acid ester)-2,3-dihydro-1H-1-(amine), 7-(boronic acid)-1,2,3,4-tetrahydronaphthalen-1-(amine), 7-(boronic acid ester)-1,2, 34-tetrahydronaphthalen-1-(amine), which include various boronic acids, boronic acid esters, and amines. The linker groups may be prepared in high yield from arylhalide precursors containing amine functionality by first deprotonation of the amine group with 1.0 molar equivalents of n-BuLi, followed by transmetalation of an arylhalide with t-BuLi and subsequent reaction with a boron-containing reagent. This amine-containing linker is then coupled with a suitable pyridine containing species, such as 6-bromo-2-pyridinecarboxaldehyde. This coupling step typically uses a metal catalyst (e.g., Pd(PPh$_3$)$_4$) in less than 5 mol % loading. Following this coupling step, the new derivative, which can be described as amine-linker-pyridine-aldehyde, is then reacted with a second amine to produce the imine derivative amine-linker-pyridine-imine in a condensation reaction. This can then be reduced to the pyridyl diamine ligand by reaction with a suitable aryl anion, alkyl anion, or hydride source. This reaction is generally performed in etherial solvents at temperatures between −100° C. and 50° C. when aryllithium or alkyllithium reagents are employed. This reaction is generally performed in methanol at reflux when sodium cyanoborohydride is employed.

The preparation of pyridyl diamide metal complexes from pyridyl diamines may be accomplished using typical protonolysis and methylation reactions. In the protonolysis reaction, the pyridyl diamine is reacted with a suitable metal reactant to produce a pyridyldiamide metal complex. A suitable metal reactant will feature a basic leaving group that will accept a proton from the pyridiyl diamine and then generally depart and be removed from the product. Suitable metal reactants include, but are not limited to, HfBn$_4$ (Bn=CH$_2$Ph), ZrBn$_4$, TiBn$_4$, ZrBn$_2$Cl$_2$(OEt$_2$), HfBn$_2$Cl$_2$(OEt$_2$)$_2$, Zr(NMe$_2$)$_2$Cl$_2$(dimethoxyethane), Hf(NMe$_2$)$_2$Cl$_2$(dimethoxyethane), Hf(NMe$_2$)$_4$, and Hf(NEt$_2$)$_4$. Pyridyldiamide metal complexes that contain metal-chloride groups, such as the PDA dichloride complex in Scheme 1 below, can be alkylated by reaction with an appropriate organometallic reagent. Suitable reagents include organolithium and organomagnesium, and Grignard reagents. The alkylations are generally performed in etherial or hydrocarbon solvents or solvent mixtures at temperatures typically ranging from −100° C. to 50° C.

covalently bonded group is part of a multidentate ligand structure, such as that described by Boussie et al. in U.S. Pat. No. 6,750,345. The unsaturated molecule will generally have

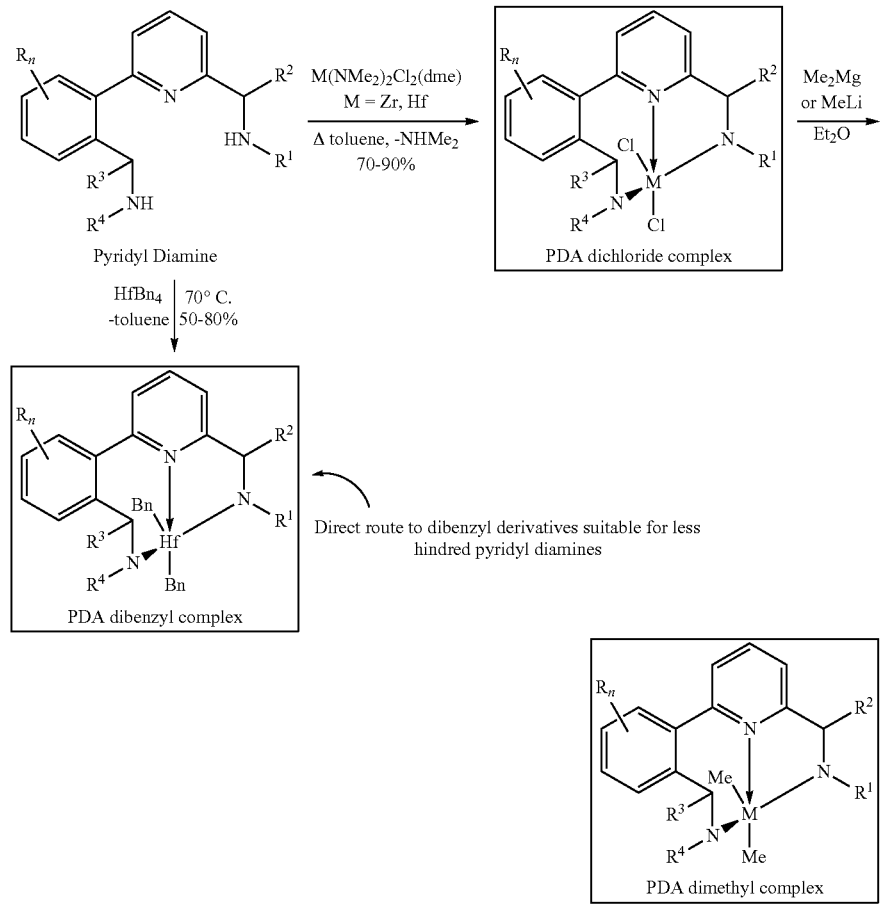

Scheme 1 where in Scheme 1, R, $R^1$, $R^2$, $R^3$, $R^4$ are independently selected from the group consisting of H, hydrocarbyls (such as alkyls, aryls), substituted hydrocarbyls (such as heteroaryls), and silyl groups, and $R_n$ indicates hydrogen, hydrocarbyls, or substituted hydrocarbyls, which may be joined to form polycyclic aromatic ring and n is 1, 2, 3, or 4.

Another route to pyridyl diamide and other complexes of interest as catalysts involves the insertion of an unsaturated molecule into a covalent metal-carbon bond where the a carbon-X double or triple bond where X is a group 14 or group 15 or group 16 element. Examples of unsaturated molecules include alkenes, alkynes, imines, nitriles, ketones, aldehydes, amides, formamides, carbon dioxide, isocyanates, thioisocyanates, and carbodiimides. Examples showing the insertion reactions involving benzophenone and N,N-dimethylformamide are below.

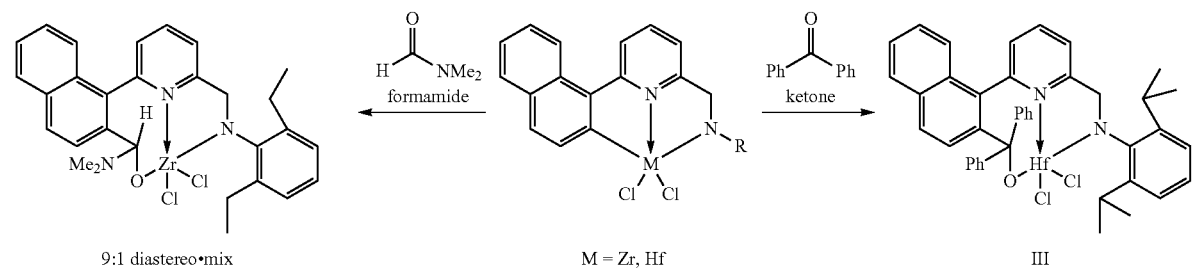

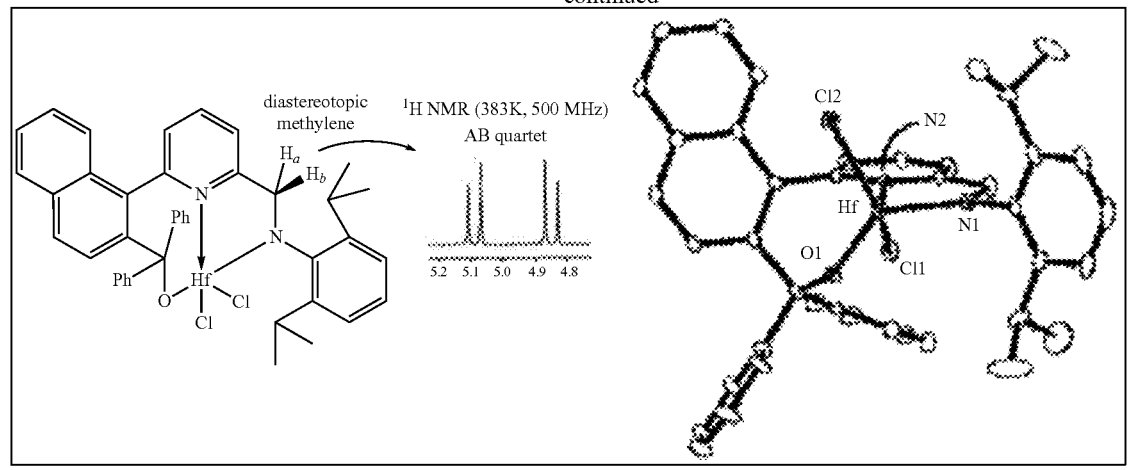

Chain Transfer Agents

For purposes of this invention and the claims thereto, the term chain transfer agent is defined to mean a compound that receives a polymeryl fragment from a catalyst compound, except that hydrogen is defined to not be a chain transfer agent for purposes of this invention. Chain transfer agents (CTA's) useful herein include triakyl aluminum compounds and dialkyl zinc compounds (where the alkyl is preferably a $C_1$ to $C_{40}$ alkyl group, preferably a $C_2$ to $C_{20}$ alkyl group, preferably a $C_2$ to $C_{12}$ alkyl group, preferably a $C_2$ to $C_8$ group, such as methyl, ethyl, propyl (including isopropyl and n-propyl), butyl (including n-butyl, sec-butyl, and iso-butyl) pentyl, hexyl, heptyl, octyl, and isomers an analogs thereof). Preferred agents, for use in the present invention, are trialkyl aluminum compounds and dialkyl zinc compounds having from 1 to 8 carbons in each alkyl group, such as triethylaluminum (TEAL), tri(i-propyl) aluminum, tri(i-butyl) aluminum (TIBAL), tri(n-hexyl) aluminum, tri(n-octyl) aluminum (TNOAL), diethyl zinc, diisobutyl zinc, and dioctyl zinc. Most preferred agents for the use of the present invention are diethyl zinc and tri(n-octyl) aluminum.

In a preferred embodiment, one or more triakyl aluminum compounds and one or more dialkyl zinc compounds (where the alkyl is preferably a $C_1$ to $C_{40}$ alkyl group, preferably a $C_2$ to $C_{20}$ alkyl group, preferably a $C_2$ to $C_{12}$ alkyl group, preferably a $C_2$ to $C_8$ group, such as methyl, ethyl, propyl (including isopropyl and n-propyl), butyl (including n-butyl, sec-butyl and iso-butyl) pentyl, hexyl, heptyl, octyl, and isomers or analogs thereof) are used as the CTA. Preferred combinations include TEAL, TIBAL, and/or TNOAL with $Et_2Zn$, preferably TEAL and $Et_2Zn$, or TIBAL and $Et_2Zn$, or TNOAL and $Et_2Zn$. Preferably, the trialkyl aluminum and dialkyl zinc compounds are present in the reaction at a molar ratio of Al to Zn of 1:1 or more, preferably 2:1 or more, preferably 5:1 or more, preferably 10:1 or more, preferably 15:1 or more preferably from 1:1 to 10,000:1.

Additional suitable chain transfer agents include the reaction product or mixture formed by combining the trialkyl aluminum or dialkyl zinc compound, preferably a tri($C_1$-$C_8$) alkyl aluminum or di($C_1$ to $C_8$)alkyl zinc compound, with less than a stoichiometric quantity (relative to the number of hydrocarbyl groups) of a secondary amine or a hydroxyl compound, especially bis(trimethylsilyl)amine, t-butyl(dimethyl)siloxane, 2-hydroxymethylpyridine, di(n-pentyl)amine, 2,6-di(t-butyl)phenol, ethyl(1-naphthyl)amine, bis(2,3,6,7-dibenzo-1-azacycloheptaneamine), or 2,6-diphenylphenol. Desirably, sufficient amine or hydroxyl reagent is used such that one hydrocarbyl group remains per metal atom. The primary reaction products of the foregoing combinations useful in the present invention as chain transfer agents include n-octylaluminum di(bis(trimethylsilyl) amide), i-propylaluminumbis(dimethyl(t-butyl)siloxide), and n-octylaluminum di(pyridinyl-2-methoxide), i-butylaluminum bis(dimethyl(t-butyl)siloxane), i-butylaluminum bis(di(trimethylsilyl)amide), n-octylaluminum di(pyridine-2-methoxide), i-butylaluminum bis(di(n-pentyl)amide), n-octylaluminum bis(2,6-di-t-butylphenoxide), n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide), ethylzinc (2,6-diphenylphenoxide), and ethylzinc (t-butoxide).

The chain transfer agent(s) are typically present in the reaction at a molar ratio of metal of the chain transfer agent to transition metal (from the pyridyldiamido transition metal complex) of 5:1 or more, preferably from 10:1 to 2000:1, preferably from 20:1 to 1000:1, preferably from 25:1 to 800:1, preferably from 50:1 to 700:1, preferably from 100:1 to 600:1.

In a useful embodiment of the invention, the CTA is dialkyl zinc, where the alkyl is a C1 to C20 alkyl group, such as methyl, ethyl, propyl, butyl, preferably the CTA is diethyl zinc.

Activators

After the complexes have been synthesized, catalyst systems may be formed by combining them with activators in any manner known from the literature, including by supporting them for use in slurry or gas phase polymerization. The catalyst systems may also be added to or generated in solution polymerization or bulk polymerization (in the monomer). The catalyst system typically comprises a complex as described above and an activator such as alumoxane or a non-coordinating anion. Activation may be performed using alumoxane solution including methyl alumoxane, referred to as MAO, as well as modified MAO, referred to herein as MMAO, containing some higher (C3+, preferably C4+) alkyl groups to improve the solubility. Particularly useful MAO can be purchased from Albemarle, typically in a 10 wt % solution in toluene. The catalyst system employed in the present invention preferably uses an activator selected from alumoxanes, such as methyl alumoxane, modified methyl alumoxane, ethyl alumoxane, iso-butyl alumoxane, and the like.

When an alumoxane or modified alumoxane is used, the complex-to-activator molar ratio is from about 1:3000 to 10:1; alternatively 1:2000 to 10:1; alternatively 1:1000 to 10:1; alternatively, 1:500 to 1:1; alternatively 1:300 to 1:1; alternatively 1:200 to 1:1; alternatively 1:100 to 1:1; alternatively 1:50 to 1:1; alternatively 1:10 to 1:1. When the activator is an alumoxane (modified or unmodified), some embodiments select the maximum amount of activator at a 5000-fold molar excess over the catalyst precursor (per metal catalytic site). The preferred minimum activator-to-complex ratio is 1:1 molar ratio.

Activation may also be performed using non-coordinating anions, referred to as NCA's, of the type described in EP 277 003 A1 and EP 277 004 A1. NCA may be added in the form of an ion pair using, for example, [DMAH]$^+$[NCA]$^-$ in which the N,N-dimethylanilinium (DMAH) cation reacts with a basic leaving group on the transition metal complex to form a transition metal complex cation and [NCA]$^-$. The cation in the precursor may, alternatively, be trityl. Alternatively, the transition metal complex may be reacted with a neutral NCA precursor, such as $B(C_6F_5)_3$, which abstracts an anionic group from the complex to form an activated species. Useful activators include N,N-dimethylanilinium tetrakis(pentafluorophenyl)borate (i.e., $[PhNMe_2H]B(C_6F_5)_4$) and N,N-dimethylanilinium tetrakis(heptafluoronaphthyl)borate, where Ph is phenyl, and Me is methyl.

Additionally preferred activators useful herein include those described in U.S. Pat. No. 7,247,687 at column 169, line 50 to column 174, line 43, particularly column 172, line 24 to column 173, line 53.

In an embodiment of the invention described herein, the non-coordinating anion activator is represented by the following formula (1):

(1)

wherein Z is (L-H) or a reducible Lewis acid; L is a neutral Lewis base; H is hydrogen and (L-H)$^+$ is a Bronsted acid; $A^{d-}$ is a non-coordinating anion having the charge d−; and d is an integer from 1 to 3.

When Z is (L-H) such that the cation component is $(L-H)_d^+$, the cation component may include Bronsted acids such as protonated Lewis bases capable of protonating a moiety, such as an alkyl or aryl, from the catalyst precursor, resulting in a cationic transition metal species, or the activating cation $(L-H)_d^+$ is a Bronsted acid, capable of donating a proton to the catalyst precursor resulting in a transition metal cation, including ammoniums, oxoniums, phosphoniums, silyliums, and mixtures thereof, or ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid, it may be represented by the formula: $(Ar_3C^+)$, where Ar is aryl or aryl substituted with a heteroatom, or a $C_1$ to $C_{40}$ hydrocarbyl, the reducible Lewis acid may be represented by the formula: $(Ph_3C^+)$, where Ph is phenyl or phenyl substituted with a heteroatom, and/or a $C_1$ to $C_{40}$ hydrocarbyl. In an embodiment, the reducible Lewis acid is triphenyl carbenium.

Embodiments of the anion component $A^{d-}$ include those having the formula $[M^{k+}Q_n]^{d-}$ wherein k is 1, 2, or 3; n is 1, 2, 3, 4, 5 or 6, or 3, 4, 5 or 6; n−k=d; M is an element selected from Group 13 of the Periodic Table of the Elements, or boron or aluminum, and Q is independently a hydride, bridged or unbridged dialkylamido, halide, alkoxide, aryloxide, hydrocarbyl radicals, said Q having up to 20 carbon atoms with the proviso that in not more than one occurrence is Q a halide, and two Q groups may form a ring structure. Each Q may be a fluorinated hydrocarbyl radical having 1 to 20 carbon atoms, or each Q is a fluorinated aryl radical, or each Q is a pentafluoryl aryl radical. Examples of suitable $A^{d-}$ components also include diboron compounds as disclosed in U.S. Pat. No. 5,447,895, which is fully incorporated herein by reference.

In an embodiment in any of the NCA's represented by Formula 1 described above, the anion component $A^{d-}$ is represented by the formula $[M^{*k*}+Q^*_n{}^*]d^{*-}$ wherein k* is 1, 2, or 3; n* is 1, 2, 3, 4, 5, or 6 (or 1, 2, 3, or 4); n*−k*=d*; M* is boron; and Q* is independently selected from hydride, bridged or unbridged dialkylamido, halogen, alkoxide, aryloxide, hydrocarbyl radicals, said Q* having up to 20 carbon atoms with the proviso that in not more than 1 occurrence is Q* a halogen.

This invention also relates to a method to polymerize olefins comprising contacting olefins (such as propylene) with a catalyst complex as described above and an NCA activator represented by the Formula (2):

(2)

where R is a monoanionic ligand; M** is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically, the NCA comprising an anion of Formula 2 also comprises a suitable cation that is essentially non-interfering with the ionic catalyst complexes formed with the transition metal compounds, or the cation is $Z_d^+$ as described above.

In an embodiment in any of the NCA's comprising an anion represented by Formula 2 described above, R is selected from the group consisting of $C_1$ to $C_{30}$ hydrocarbyl radicals. In an embodiment, $C_1$ to $C_{30}$ hydrocarbyl radicals may be substituted with one or more $C_1$ to $C_{20}$ hydrocarbyl radicals, halide, hydrocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means $C_4$ to $C_{20}$ hydroride; bulky alkoxides, where bulky means $C_4$ to $C_{20}$ hydrocarbyl radicals; —SR$^a$, —NR$^a{}_2$, and —PR$^a{}_2$, where each R$^a$ is independently a monovalent $C_4$ to $C_{20}$ hydrocarbyl radical comprising a molecular volume greater than or equal to the molecular volume of an isopropyl substitution or a $C_4$ to $C_{20}$ hydrocarbyl substituted organometalloid having a molecular volume greater than or equal to the molecular volume of an isopropyl substitution.

In an embodiment in any of the NCA's comprising an anion represented by Formula 2 described above, the NCA also comprises cation comprising a reducible Lewis acid represented by the formula: $(Ar_3C^+)$, where Ar is aryl or aryl substituted with a heteroatom, and/or a $C_1$ to $C_{40}$ hydrocarbyl, or the reducible Lewis acid represented by the formula: $(Ph_3C^+)$, where Ph is phenyl or phenyl substituted with one or more heteroatoms, and/or $C_1$ to $C_{40}$ hydrocarbyls.

In an embodiment in any of the NCA's comprising an anion represented by Formula 2 described above, the NCA may also comprise a cation represented by the formula, $(L-H)_d^+$, wherein L is an neutral Lewis base; H is hydrogen; (L-H) is a Bronsted acid; and d is 1, 2, or 3, or $(L-H)_d^+$ is a Bronsted acid selected from ammoniums, oxoniums, phosphoniums, silyliums, and mixtures thereof.

Further examples of useful activators include those disclosed in U.S. Pat. Nos. 7,297,653 and 7,799,879, which are fully incorporated by reference herein.

In an embodiment, an activator useful herein comprises a salt of a cationic oxidizing agent and a noncoordinating, compatible anion represented by the Formula (3):

$$(OX^{e+})_d(A^{d-})_e \qquad (3)$$

wherein $OX^{e+}$ is a cationic oxidizing agent having a charge of e+; e is 1, 2 or 3; d is 1, 2 or 3; and $A^{d-}$ is a non-coordinating anion having the charge of d− (as further described above). Examples of cationic oxidizing agents include: ferrocenium, hydrocarbyl-substituted ferrocenium, $Ag^+$, or $Pb^{+2}$. Suitable embodiments of $A^{d-}$ include tetrakis(pentafluorophenyl)borate.

Activators useful in catalyst systems herein include: trimethylammonium tetrakis(perfluoronaphthyl)borate, N,N-dimethylanilinium tetrakis(perfluoronaphthyl)borate, N,N-diethylanilinium tetrakis(perfluoronaphthyl)borate, triphenylcarbenium tetrakis(perfluoronaphthyl)borate, trimethylammonium tetrakis(perfluorobiphenyl)borate, N,N-dimethylanilinium tetrakis(perfluorobiphenyl)borate, triphenylcarbenium tetrakis(perfluorobiphenyl)borate, and the types disclosed in U.S. Pat. No. 7,297,653, which is fully incorporated by reference herein.

Suitable activators also include:
N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Ph_3C^+][B(C_6F_5)_4^-]$, $[Me_3NH^+][B(C_6F_5)_4^-]$; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In an embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In an embodiment, two NCA activators may be used in the polymerization and the molar ratio of the first NCA activator to the second NCA activator can be any ratio. In an embodiment, the molar ratio of the first NCA activator to the second NCA activator is 0.01:1 to 10,000:1, or 0.1:1 to 1000:1, or 1:1 to 100:1.

In an embodiment of the invention, the NCA activator-to-catalyst ratio is a 1:1 molar ratio, or 0.1:1 to 100:1, or 0.5:1 to 200:1, or 1:1 to 500:1 or 1:1 to 1000:1. In an embodiment, the NCA activator-to-catalyst ratio is 0.5:1 to 10:1, or 1:1 to 5:1.

In an embodiment, the catalyst compounds can be combined with combinations of alumoxanes and NCA's (see for example, U.S. Pat. No. 5,153,157, U.S. Pat. No. 5,453,410, EP 0 573 120 B1, WO 94/07928, and WO 95/14044 which discuss the use of an alumoxane in combination with an ionizing activator, all of which are incorporated by reference herein).

In a preferred embodiment of the invention, when an NCA (such as an ionic or neutral stoichiometric activator) is used, the complex-to-activator molar ratio is typically from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2.

Alternately a co-activator, such as a group 1, 2, or 13 organometallic species (e.g., an alkyl aluminum compound such as tri-n-octyl aluminum), may also be used in the catalyst system herein. The complex-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1; 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

Polymerization

The catalyst systems described herein are useful in polymerizing unsaturated monomers conventionally known to undergo transition metal catalyzed coordinative polymerization such as solution, slurry, gas-phase, and high-pressure polymerization. Typically, one or more of the complexes described herein, one or more activators, ethylene and one or more C3 to C20 comonomers (preferably propylene) are contacted to produce ethylene copolymer(s). The complexes may be supported and as such will be particularly useful in fixed-bed, moving-bed, fluid-bed, slurry, solution, or bulk operating modes conducted in single, series, or parallel reactors.

One or more reactors in series or in parallel may be used in the present invention. The complexes, activator and chain transfer agent, may be delivered as a solution or slurry, either separately to the reactor, activated in-line just prior to the reactor, or preactivated and pumped as an activated solution or slurry to the reactor. Polymerizations are carried out in either single reactor operation, in which monomer, comonomers, catalyst/activator/co-activator, optional scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to first reaction and another component to other reactors. In one preferred embodiment, the complex is activated in the reactor in the presence of olefin.

Generally speaking, any process may be used to prepare the polymers of this disclosure including the use of a single continuous flow stirred tank reactor (CSTR). Other modifications, such as the use of two reactors in series or parallel to tailor the MWD of the polymer, are also contemplated.

In a preferred embodiment, the polymerization process is performed in a batch reactor, semi-continuous batch reactor, a CSTR reactor or tubular reactor or a combination of any of the foregoing.

In a particularly preferred embodiment, the polymerization process is a continuous process.

Polymerization process used herein typically comprises contacting ethylene and one or more C3 to C20 alkene comonomers (preferably propylene) with the complexes (and, optionally, activator) described herein. For purpose of this invention, alkenes are defined to include multi-alkenes (such as dialkenes) and alkenes having just one double bond. Polymerization may be homogeneous (solution or bulk polymerization). Chain transfer agents (such diethyl zinc or tri(n-octyl) aluminum) are generally used in the practice of this invention.

The present polymerization processes may be conducted under conditions preferably including a temperature of about 30° C. to about 200° C., preferably from 60° C. to 195° C., preferably from 75° C. to 190° C. The process may be conducted at a pressure of from 0.05 to 1500 MPa. In a preferred embodiment, the pressure is between 1.7 MPa and 30 MPa, or in another embodiment, especially under supercritical conditions, the pressure is between 15 MPa and 1500 MPa.

Monomers

Monomers useful herein include olefins having from 2 to 20 carbon atoms, alternately 2 to 12 carbon atoms (preferably ethylene, propylene, butylene, pentene, hexene, heptene, octene, nonene, decene, and dodecene) and optionally also polyenes (such as dienes). Particularly preferred monomers include ethylene, and mixtures of $C_2$ to $C_{10}$ alpha olefins, such as ethylene-propylene, ethylene-hexene, ethylene-octene, and the like.

The complexes described herein are particularly effective for the polymerization of ethylene and at least one other olefinically unsaturated monomer, such as a $C_3$ to $C_{20}$ α-olefin, and particularly a $C_3$ to $C_{12}$ α-olefin. Examples of preferred α-olefins comonomers include propylene, butene-1, pentene-1, hexene-1, heptene-1, octene-1, nonene-1, decene-1, dodecene-1,4-methylpentene-1,3-methylpentene-1,3,5,5-trimethylhexene-1, and 5-ethylnonene-1.

In a preferred embodiment, the catalyst complexes described herein, preferably as represented by formula (A), (B), (C) or (D), preferably formula (C) or (D), are used in any polymerization process described above to produce ethylene homopolymers or copolymers.

Scavengers

In some embodiments, when using the complexes described herein, particularly when they are immobilized on a support, the catalyst system may additionally comprise one or more scavenging compounds. Here, the term scavenging compound means a compound that removes polar impurities from the reaction environment. These impurities adversely affect catalyst activity and stability. Typically, the scavenging compound will be an organometallic compound such as the Group-13 organometallic compounds of U.S. Pat. Nos. 5,153,157, 5,241,025 and WO-A-91/09882, WO-A-94/03506, WO-A-93/14132, and that of WO 95/07941. Exemplary compounds include triethyl aluminum, triethyl borane, tri-iso-butyl aluminum, methyl alumoxane, iso-butyl alumoxane, tri-n-octyl aluminum, bis(diisobutylaluminum)oxide, modified methylalumoxane. (Useful modified methylalumoxane include cocatalyst type 3A (commercially available from Akzo Chemicals, Inc. under the trade name Modified Methylalumoxane type 3A) and those described in U.S. Pat. No. 5,041,584).) Those scavenging compounds having bulky or $C_6$-$C_{20}$ linear hydrocarbyl substituents connected to the metal or metalloid center usually minimize adverse interaction with the active catalyst. Examples include triethylaluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, [Me$_2$HNPh]$^+$[B(pfp)$_4$]$^-$ or B(pfp)$_3$ (perfluorophenyl=pfp=C$_6$F$_5$).

In a preferred embodiment, two or more complexes are combined with diethyl zinc in the same reactor with monomer. Alternately, one or more complexes are combined with another catalyst (such as a metallocene) and diethyl zinc in the same reactor with monomer.

End Uses

Articles made using copolymers produced herein may include, for example, molded articles (such as containers and bottles, e.g., household containers, industrial chemical containers, personal care bottles, medical containers, fuel tanks, and storageware, toys, sheets, pipes, tubing) films, non-wovens, and the like. It should be appreciated that the list of applications above is merely exemplary, and is not intended to be limiting.

In other embodiments of the invention, the ethylene copolymers produced herein are used lubricating compositions, typically as viscosity modifiers.

Lubrication Oil Composition

Lubricating oil compositions containing the copolymer produced herein and one or more base oils (or basestocks) are also provided. The basestock can be or include natural or synthetic oils of lubricating viscosity, whether derived from hydrocracking, hydrogenation, other refining processes, unrefined processes, or re-refined processes. The basestock can be or include used oil. Natural oils include animal oils, vegetable oils, mineral oils and mixtures thereof. Synthetic oils include hydrocarbon oils, silicon-based oils, and liquid esters of phosphorus-containing acids. Synthetic oils may be produced by Fischer-Tropsch gas-to-liquid synthetic procedure as well as other gas-to-liquid oils.

In one embodiment, the basestock is or includes a polyalphaolefin (PAO) including a PAO-2, PAO-4, PAO-5, PAO-6, PAO-7 or PAO-8 (the numerical value relating to Kinematic Viscosity at 100° C., ASTM D 445). Preferably, the polyalphaolefin is prepared from dodecene and/or decene. Generally, the polyalphaolefin suitable as an oil of lubricating viscosity has a viscosity less than that of a PAO-20 or PAO-30 oil. In one or more embodiments, the basestock can be defined as specified in the American Petroleum Institute (API) Base Oil Interchangeability Guidelines. For example, the basestock can be or include an API Group I, II, III, IV, and V oil or mixtures thereof.

PAOs useful herein are commercially available as SpectraSyn™ and SpectraSyn Ultra™ from ExxonMobil Chemical in Houston, Tex. (previously sold under the SHF and SuperSyn™ tradenames by ExxonMobil Chemical Company), some of which are summarized in Table A below. Other useful PAOs include those sold under the tradenames Synfluid™ available from ChevronPhillips Chemical Company (Pasadena, Tex.), Durasyn™ available from Innovene (Chicago, Ill.), Nexbase™ available from Neste Oil (Keilaniemi, Finland), and Synton™ available from Chemtura Corporation (Middlebury, Conn.).

TABLE A

SpectraSyn ™ Series Polyalphaolefins

| | KV @ 100° C., cSt | KV @ 40° C., cSt | VI | Pour Point, ° C. | Specific gravity | Flash Point, ° C. | APHA Color |
|---|---|---|---|---|---|---|---|
| SpectraSyn 4 | 4 | 19 | 126 | −66 | 0.820 | 220 | 10 |
| SpectraSyn Plus 4 | 4 | 17 | 122 | −60 | 0.820 | 228 | 10 |
| SpectraSyn 6 | 6 | 31 | 138 | −57 | 0.827 | 246 | 10 |

TABLE A-continued

SpectraSyn ™ Series Polyalphaolefins

|  | KV @ 100° C., cSt | KV @ 40° C., cSt | VI | Pour Point, ° C. | Specific gravity | Flash Point, ° C. | APHA Color |
|---|---|---|---|---|---|---|---|
| SpectraSyn Plus 6 | 6 | 30 | 140 | −54 | 0.827 | 246 | 10 |
| SpectraSyn 8 | 8 | 48 | 139 | −48 | 0.833 | 260 | 10 |
| SpectraSyn 10 | 10 | 66 | 137 | −48 | 0.835 | 266 | 10 |
| SpectraSyn 40 | 39 | 396 | 147 | −36 | 0.850 | 281 | 10 |
| SpectraSyn 100 | 100 | 1240 | 170 | −30 | 0.853 | 283 | 60 |
| SpectraSyn Ultra 150 | 150 | 1,500 | 218 | −33 | 0.850 | >265 | 10 |
| SpectraSyn Ultra 300 | 300 | 3,100 | 241 | −27 | 0.852 | >265 | 20 |
| SpectraSyn Ultra 1000 | 1,000 | 10,000 | 307 | −18 | 0.855 | >265 | 30 |

In one or more embodiments, the basestock can include oil or blends thereof conventionally employed as crankcase lubricating oils. For example, suitable basestocks can include crankcase lubricating oils for spark-ignited and compression-ignited internal combustion engines, such as automobile and truck engines, marine and railroad diesel engines, and the like. Suitable basestocks can also include those oils conventionally employed in and/or adapted for use as power transmitting fluids such as automatic transmission fluids, tractor fluids, universal tractor fluids and hydraulic fluids, heavy duty hydraulic fluids, power steering fluids and the like. Suitable basestocks can also be or include gear lubricants, industrial oils, pump oils and other lubricating oils.

In one or more embodiments, the basestock can include not only hydrocarbon oils derived from petroleum, but also include synthetic lubricating oils such as esters of dibasic acids; complex esters made by esterification of monobasic acids, polyglycols, dibasic acids and alcohols; polyolefin oils, etc. Thus, the lubricating oil compositions described can be suitably incorporated into synthetic base oil basestocks such as alkyl esters of dicarboxylic acids, polyglycols and alcohols; polyalpha-olefins; polybutenes; alkyl benzenes; organic esters of phosphoric acids; polysilicone oils; etc.

The lubrication oil composition can include a basestock and one or more copolymers produced herein, and optionally, a pour point depressant. The lubrication oil composition can have a thickening efficiency greater than 1.5, or greater than 1.7, or greater than 1.9, or greater than 2.2, or greater than 2.4 or greater than 2.6. The lubrication oil composition can have a shear stability index less than 55, or less than 45, or less than 35, or less than 30, or less than 25, or less than 20, or less than 15. The lubrication oil composition can have a complex viscosity at −35° C. of less than 500, or less than 450, or less than 300, or less than 100, or less than 50, or less 20, or less than 10 centistokes, as used herein, the term "complex viscosity" means a frequency-dependent viscosity function determined during forced small amplitude harmonic oscillation of shear stress, in units of Pascal-seconds, that is equal to the difference between the dynamic viscosity and the out-of-phase viscosity (imaginary part of "complex viscosity"). For purposes of this invention and the claims thereto, complex viscosity is determined using Anton-Parr Low Temperature Solution Rheology (low temperature rheology). Experiments are done on an Anton-Parr Model MCR501 rheometer using a 1" cone and plate setup. The cone has a nominal 1 degree angle and 50 micron gap. About 100 microliters of sample is deposited on the bottom plate using a syringe-pipette. The cone is then lowered onto the plate so that the volume between the cone and plate is fully occupied by solution. The temperature is then lowered at a cooling rate of 1.5° C./min. while measuring the complex viscosity at an angular frequency of 0.1 radians/sec applying a 10% strain and recording a value every minute. The viscosity at 0.1 rad/sec is then plotted as a function of temperature to observe the effect of gelation.

The lubrication oil composition can have a Mini Rotary Viscometer (MRV) viscosity at −35° C. in a 10 W-50 formulation of less than 60,000 cps according to ASTM 1678. The lubrication oil composition can have any combination of desired properties. For example, the lubrication oil composition can have a thickening efficiency greater than about 1.5 or greater than about 2.6, a shear stability index of less than 55 or less than 35 or less than 25, a complex viscosity at −35° C. of less than 500 cSt or less than 300 cSt or less than 50 cSt, and/or a Mini Rotary Viscometer (MRV) viscosity at −35° C. in a 10 W-50 formulation of less than about 60,000 cps according to ASTM 1678.

Thickening efficiency (TE) is a measure of the thickening ability of the polymer in oil, and is defined as: TE=2/c×ln$((kv_{(polymer+oil)})/kv_{oil})/\ln(2)$, where c is the concentration of the polymer and kv is kinematic viscosity at 100° C. according to ASTM D445. The shear stability index (SSI) is an indication of the resistance of polymers to permanent mechanical shear degradation in an engine. The SSI can be determined by passing a polymer-oil solution for 30 cycles through a high shear Bosch diesel injector according to the procedures listed in ASTM D6278.

The lubrication oil composition preferably comprises about 0.1 to about 2.5 wt %, or about 0.25 to about 1.5 wt %, or about 0.5 wt % or about 1.0 wt % of the polymer produced herein. In some embodiments, the amount of the polymer produced herein in the lubrication oil composition can range from a low of about 0.5 wt %, about 1 wt %, or about 2 wt % to a high of about 2.5 wt %, about 3 wt %, about 5 wt %, or about 10 wt %.

Oil Additives

The lubricating oil compositions can optionally contain one or more conventional additives, such as, for example, pour point depressants, antiwear agents, antioxidants, other viscosity-index improvers, dispersants, corrosion inhibitors, anti-foaming agents, detergents, rust inhibitors, friction modifiers, and the like.

Corrosion inhibitors, also known as anti-corrosive agents, reduce the degradation of the metallic parts contacted by the lubricating oil composition. Illustrative corrosion inhibitors include phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 wt % of a sulfide of phosphorus for ½ to 15 hours, at a temperature in the range of 66° C. to 316° C. Neutralization of the phosphosulfurized hydrocarbon may be effected in the manner known by those skilled in the art.

Oxidation inhibitors, or antioxidants, reduce the tendency of mineral oils to deteriorate in service, as evidenced by the products of oxidation such as sludge and varnish-like deposits on the metal surfaces, and by viscosity growth. Such oxidation inhibitors include alkaline earth metal salts of alkylphenolthioesters having $C_5$ to $C_{12}$ alkyl side chains, e.g., calcium nonylphenate sulfide, barium octylphenate sulfide, dioctylphenylamine, phenylalphanaphthylamine, phosphosulfurized or sulfurized hydrocarbons, etc. Other oxidation inhibitors or antioxidants useful in this invention include oil-soluble copper compounds, such as described in U.S. Pat. No. 5,068,047.

Friction modifiers serve to impart the proper friction characteristics to lubricating oil compositions such as automatic transmission fluids. Representative examples of suitable friction modifiers are found in U.S. Pat. No. 3,933,659, which discloses fatty acid esters and amides; U.S. Pat. No. 4,176,074, which describes molybdenum complexes of polyisobutenyl succinic anhydride-amino alkanols; U.S. Pat. No. 4,105,571, which discloses glycerol esters of dimerized fatty acids; U.S. Pat. No. 3,779,928, which discloses alkane phosphonic acid salts; U.S. Pat. No. 3,778,375, which discloses reaction products of a phosphonate with an oleamide; U.S. Pat. No. 3,852,205, which discloses S-carboxyalkylene hydrocarbyl succinimide, 5-carboxyalkylene hydrocarbyl succinamic acid and mixtures thereof; U.S. Pat. No. 3,879,306, which discloses N(hydroxyalkyl)alkenyl-succinamic acids or succinimides; U.S. Pat. No. 3,932,290, which discloses reaction products of di-(lower alkyl) phosphites and epoxides; and U.S. Pat. No. 4,028,258, which discloses the alkylene oxide adduct of phosphosulfurized N-(hydroxyalkyl) alkenyl succinimides. Preferred friction modifiers are succinate esters, or metal salts thereof, of hydrocarbyl substituted succinic acids or anhydrides and thiobis-alkanols, such as described in U.S. Pat. No. 4,344,853.

Dispersants maintain oil insolubles, resulting from oxidation during use, in suspension in the fluid, thus preventing sludge flocculation and precipitation or deposition on metal parts. Suitable dispersants include high molecular weight N-substituted alkenyl succinimides, the reaction product of oil-soluble polyisobutylene succinic anhydride with ethylene amines such as tetraethylene pentamine and borated salts thereof. High molecular weight esters (resulting from the esterification of olefin substituted succinic acids with mono or polyhydric aliphatic alcohols) or Mannich bases from high molecular weight alkylated phenols (resulting from the condensation of a high molecular weight alkylsubstituted phenol, an alkylene polyamine and an aldehyde such as formaldehyde) are also useful as dispersants.

Pour point depressants ("ppd"), otherwise known as lube oil flow improvers, lower the temperature at which the fluid will flow or can be poured. Any suitable pour point depressant known in the art can be used. For example, suitable pour point depressants include, but are not limited to, one or more $C_8$ to $C_{18}$ dialkylfumarate vinyl acetate copolymers, polymethyl methacrylates, alkylmethacrylates and wax naphthalene.

Foam control can be provided by any one or more anti-foamants. Suitable anti-foamants include polysiloxanes, such as silicone oils and polydimethyl siloxane.

Anti-wear agents reduce wear of metal parts. Representatives of conventional antiwear agents are zinc dialkyldithiophosphate and zinc diaryldithiosphate, which also serve as an antioxidant.

Detergents and metal rust inhibitors include the metal salts of sulphonic acids, alkyl phenols, sulfurized alkyl phenols, alkyl salicylates, naphthenates and other oil soluble mono- and dicarboxylic acids. Highly basic (viz, overbased) metal sales, such as highly basic alkaline earth metal sulfonates (especially Ca and Mg salts) are frequently used as detergents.

Compositions containing these conventional additives can be blended with the basestock in amounts effective to provide their normal attendant function. Thus, typical formulations can include, in amounts by weight, a VI improver (from about 0.01% to about 12%); a corrosion inhibitor (from about 0.01% to about 5%); an oxidation inhibitor (from about 0.01% to about 5%); depressant (of from about 0.01% to about 5%); an anti-foaming agent (from about 0.001% to about 3%); an anti-wear agent (from about 0.001% to about 5%); a friction modifier (from about 0.01% to about 5%); a detergent/rust inhibitor (from about 0.01 to about 10%); and a base oil.

When other additives are used, it may be desirable, although not necessary, to prepare additive concentrates that include concentrated solutions or dispersions of the VI improver (in concentrated amounts), together with one or more of the other additives, such a concentrate denoted an "additive package," whereby several additives can be added simultaneously to the basestock to form a lubrication oil composition. Dissolution of the additive concentrate into the lubrication oil can be facilitated by solvents and by mixing accompanied with mild heating, but this is not essential. The additive-package can be formulated to contain the VI improver and optional additional additives in proper amounts to provide the desired concentration in the final formulation when the additive-package is combined with a predetermined amount of base oil.

Blending with Basestock Oils

Conventional blending methods are described in U.S. Pat. No. 4,464,493, which is incorporated by reference herein. This conventional process requires passing the polymer through an extruder at elevated temperature for degradation of the polymer and circulating hot oil across the die face of the extruder while reducing the degraded polymer to particle size upon issuance from the extruder and into the hot oil. The pelletized, solid polymer of the present invention, as described above, can be added by blending directly with the base oil so as give directly viscosity for the VI improver, so that the complex multi-step process of the prior art is not needed. The solid polymer composition can be dissolved in the basestock without the need for additional shearing and degradation processes.

The polymer compositions will be soluble at room temperature in lube oils at up to 10 percent concentration in order to prepare a viscosity modifier concentrate. Such concentrates, including eventually an additional additive package including the typical additives used in lube oil applications as described above, are generally further diluted to the final concentration (usually around 1%) by multi-grade lube oil producers. In this case, the concentrate will be a pourable homogeneous solid-free solution.

The copolymers produced herein preferably have a shear stability index of SSI (determined according to ASTM D6278, 30 cycles) of from about 6 to about 50, preferably 10 to 40, preferably 10 to 20.

The copolymers produced herein preferably have a shear stability index of SSI (determined according to ASTM D6278 and D7109, 90 cycles) of from about 8 to about 65, preferably 10 to 50, preferably 10 to 40.

In another embodiment, this invention relates to:
1. An ethylene propylene copolymer, useful for viscosity modification applications, said copolymer having:
   1) an Mw(LS)/Mn(Dri) of from 1 to 2.5 (preferably from 1 to 2.0, preferably from 1 to 1.75, preferably from 1.05 to 1.50);
   2) an Mw (LS) of from 3,000 to 300,000 g/mol (preferably from 50,000 to 200,000 g/mol, preferably 75,000 to 125,000 g/mol);
   3) a g'vis of 0.90 or more (preferably 0.95 or more, preferably 0.98 or more),
   4) an ethylene content of 35 mol % to 85 mol % (preferably 40 to 80 mole %, preferably 60 to 75 mol %);
   5) a C3 to C20 comonomer(s) (such as alpha-olefins) content of from 15 to 65 mol % (preferably 20 to 60 mol %, preferably 25 to 40 mol %);
   6) a ratio of thickening efficiency to shear stability index (30 cycles) of 1:3 to 1:20 (preferably 1:4 to 1:18, preferably 1:5 to 1:15);
   7) a melting point (Tm) of 65° C. or less (preferably 55° C. or less, preferably 45° C. or less, preferably 10° C. or less); and
   8) a viscosity index of 150 or greater (preferably 170 or more, preferably 200 or more, preferably 220 or more).
2. The copolymer of paragraph 1 wherein the ethylene copolymer has a ratio of thickening efficiency to lubricating oil viscosity (KV100) of 2:1 or more (preferably 2.1:1 or greater, preferably 2.2:1 or greater, preferably 3:1 or more), when 1 wt % of the ethylene copolymer is added to a lubricating oil, such a basestock having a KV100 of 10 cSt.
3. The copolymer of paragraph 1 or 2 wherein the comonomer(s) are selected from the group consisting of C3 to C20 comonomers, preferably C3 to C20 alpha olefins, preferably one or more of methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and isomers thereof, preferably propylene.
4. The copolymer of paragraph 1, 2, or 3 wherein the comonomer is propylene.
5. The copolymer of paragraph 1, 2, 3, or 4 wherein the copolymer has a kinematic viscosity at 100° C., as measured by ASTM 445, of 20 cSt or greater,
6. The copolymer of paragraph 1, 2, 3, 4, or 5 wherein the copolymer does not increase the color of a lubricant (such as PAO-10) by more than 1 unit (preferably by more than 0.5 units, preferably 0 units), as measured by ASTM 1500, when added to the lubricant at 2 wt %.
7. The copolymer of paragraph 1, 2, 3, 4, 5, or 6 wherein when 1 wt % of the ethylene copolymer is added to a lubricating composition (such as PAO-10), the viscosity (KV100) increases by at least 50%, preferably by at least 100%, preferably by at least 200%, preferably by at least 500%.
8. The copolymer of any of paragraphs 1 to 7, wherein propylene is present at from 60 to 75 mole % and ethylene is present at from 25 to 40 wt %.
9. The copolymer of any of paragraphs 1 to 8, wherein the copolymer has a KV100 of 10 cSt or more and a VI of 150 or more.
10. The copolymer of any of paragraphs 1 to 9, wherein the copolymer has a thickening efficiency of 2.1 or more.
11. A process to prepare ethylene copolymer (particularly the ethylene copolymer of paragraphs 1 to 10) comprising contacting ethylene and at least one C3 to C20 comonomer with a catalyst system comprising an activator, a chain transfer agent, and a pyridyldiamido transition metal complex represented by the formula: (A), (B), (C), or (D):

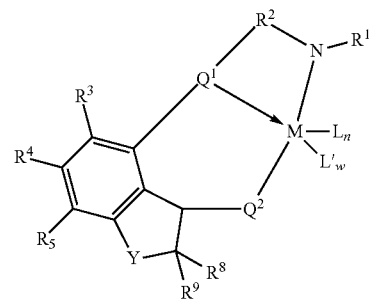

(A)

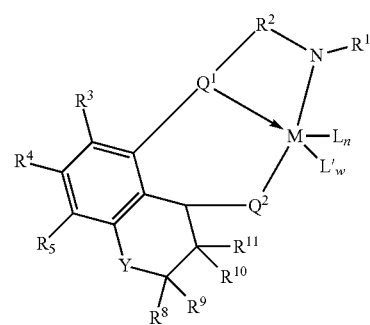

(B)

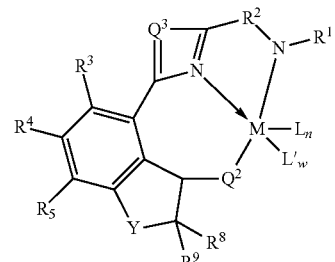

(C)

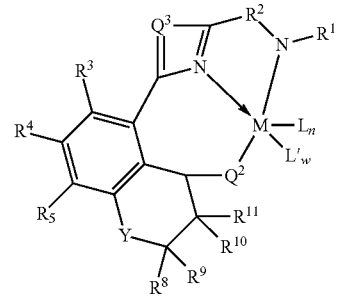

(D)

wherein:
M is a Group 3 or 4 metal;
$Q^1$ is a three atom bridge with the central of the three atoms being a group 15 or 16 element (said group 15 element may or may not be substituted with an $R^{30}$ group) represented by the formula: -$G^1$-$G^2$-$G^3$- where $G^2$ is a group 15 or 16 atom (said group 15 element may be substituted with a $R^{30}$ group), $G^1$ and $G^3$ are each a group 14, 15 or 16 atom (each group 14, 15 and 16 element may or may not be substituted with one or more $R^{30}$ groups), where $G^1$, $G^2$ and $G^3$, or $G^1$ and $G^2$, or $G^1$ and $G^3$, or $G^2$ and $G^3$ may form a singular or multi ring system;

each R$^{30}$ group is, independently, hydrogen or a C$_1$ to C$_{100}$ hydrocarbyl group or a silyl group;

Q$^2$ is —NR$^{17}$, —PR$^{17}$, where R$^{17}$ is selected from hydrocarbyls, substituted hydrocarbyls, silyls, and germyls;

Q$^3$ is -(TT)- or -(TTT)- where each T is carbon or a heteroatom, and said carbon or heteroatom may be unsubstituted or substituted with one or more R$^{30}$ groups that together with the "—C-Q$^3$=C—" fragment, forms a 5- or 6-membered cyclic group or a polycyclic group including the 5 or 6 membered cyclic group;

R$^1$ is selected from the group consisting of hydrocarbyls, and substituted hydrocarbyls, or silyl groups;

R$^3$, R$^4$, and R$^5$ are independently selected from the group consisting of hydrogen, hydrocarbyls, substituted hydrocarbyls, alkoxy, aryloxy, halogen, amino, and silyl, and wherein adjacent R groups (R$^3$ & R$^4$ and/or R$^4$ & R$^5$) may be joined to form a substituted or unsubstituted hydrocarbyl or heterocyclic ring, where the ring has 5, 6, 7, or 8 ring atoms and where substitutions on the ring can join to form additional rings;

R$^6$, R$^7$, R$^8$, R$^9$, R$^{10}$, R$^{11}$, R$^{12}$, and R$^{13}$ are independently selected from the group consisting of hydrogen, hydrocarbyls, substituted hydrocarbyls, alkoxy, halogen, amino, and silyl, and wherein adjacent R groups (R$^6$ & R$^7$, and/or R$^8$ & R$^9$, and/or R$^9$ & R$^{10}$, and/or R$^{10}$ & R$^{11}$ and/or R$^{12}$ & R$^{13}$) may be joined to form a saturated, substituted or unsubstituted hydrocarbyl or heterocyclic ring, where the ring has 5, 6, 7, or 8 ring carbon atoms and where substitutions on the ring can join to form additional rings;

R$^2$ is -E(R$^{12}$)(R$^{13}$)— with E being carbon, silicon, or germanium;

Y is selected from oxygen, sulfur, and -E*(R$^6$)(R$^7$)—, with E* being carbon, silicon, or germanium;

L is an anionic leaving group, where the L groups may be the same or different and any two L groups may be linked to form a dianionic leaving group;

n is 1 or 2;

L' is neutral Lewis base; and w is 0, 1, 2, 3 or 4.

12. The process of paragraph 11, wherein M is Ti, Zr, or Hf.

13. The process of paragraph 11 or 12, wherein R$^2$ is selected from CH$_2$, CH(aryl), CH(2-isopropylphenye, CH(2,6-dimethylphenyl), CH(2,4-6-trimethylphenye, CH(alkyl), CMe$_2$, SiMe$_2$, SiEt$_2$, and SiPh$_2$.

14. The process of paragraph 11, 12, or 13, wherein T is C, O, S, or N.

15. The process of paragraph 11, 12, 13, or 14, wherein E and E* are carbon and each R$^6$, R$^7$, R$^{12}$, and R$^{13}$ are a C$_1$ to C$_{30}$ substituted or unsubstituted hydrocarbyl group.

16. The process of paragraph 11, 12, 13, 14, or 15, wherein E and E* are carbon and each R$^6$, R$^7$, R$^{12}$, and R$^{13}$ are a C$_6$ to C$_{30}$ substituted or unsubstituted aryl group.

17. The process of paragraph 11, 12, 13, 14, 15, or 16, wherein Q$^2$ is —NR$^{17}$.

18. The process of paragraph 11, 12, 13, 14, 15, 16, or 17, wherein E and E* are carbon and R$^1$ and R$^{17}$ are independently selected from phenyl groups that are substituted with 0, 1, 2, 3, 4, or 5 substituents selected from the group consisting of F, Cl, Br, I, CF$_3$, NO$_2$, alkoxy, dialkylamino, hydrocarbyl, and substituted hydrocarbyl groups with from one to ten carbons.

19. The process of any of paragraphs 11 to 18, wherein Q$^1$ is selected from:

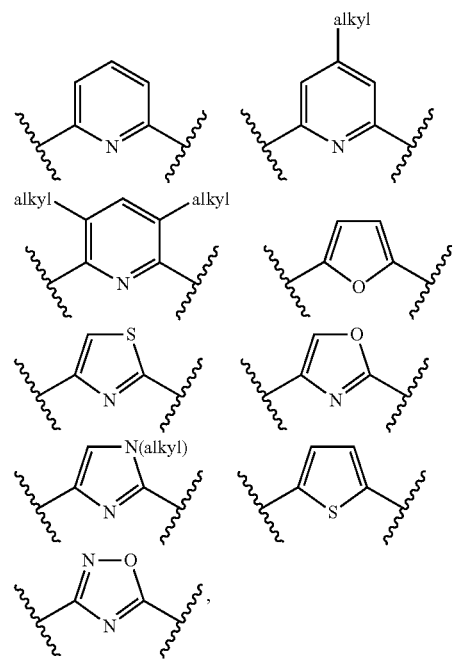

where the symbols indicate the connections to R$^2$ and the aromatic ring, and alkyl is an alkyl group.

20. The process of any of paragraphs 11 to 19, wherein each L is independently selected from the group consisting of halide, alkyl, aryl, alkoxy, amido, hydrido, phenoxy, hydroxy, silyl, allyl, alkenyl, triflate, alkylsulfonate, arylsulfonate, and alkynyl; and each L' is independently selected from the group consisting of ethers, thio-ethers, amines, nitriles, imines, pyridines, and phosphines.

21. The process of any of paragraphs 11 to 20, wherein Q$^3$ is CHCHCH, CHCH, CHN(alkyl), CH—S, CHC(alkyl)CH, C(alkyl)CHC(alkyl), CH—O, or NO.

22. The process of any of paragraphs 11 to 21, wherein the complex is represented by formula (A).

23. The process of any of paragraphs 11 to 21, wherein the complex is represented by formula (B).

24. The process of any of paragraphs 11 to 21, wherein the complex is represented by formula (C).

25. The process of any of paragraphs 11 to 21, wherein the complex is represented by formula (D).

26. The process of any of paragraphs 11 to 25, wherein the activator comprises an alumoxane.

27. The process of any of paragraphs 11 to 26, wherein the activator comprises a non-coordinating anion.

28. The process of any of paragraphs 11 to 27, wherein the activator comprises one or more of:

trimethylammonium tetrakis(perfluoronaphthyl)borate, N,N-dimethylanilinium tetrakis(perfluoronaphthyl)borate, N,N-diethylanilinium tetrakis(perfluoronaphthyl)borate, triphenylcarbenium tetrakis(perfluoronaphthyl)borate, trimethylammonium tetrakis(perfluorobiphenyeborate, N,N-dimethylanilinium tetrakis(perfluorobiphenyl)borate, triphenylcarbenium tetrakis(perfluorobiphenyl)borate, N,N-dimethylanilinium tetrakis(3,5-bis(trifluoromethyl)phenyl)borate, triphenylcarbenium tetrakis (perfluoronaphthyeborate, triphenylcarbenium tetrakis (perfluorobiphenyl)borate, triphenylcarbenium tetrakis(3,5-bis(trifluoromethyl)phenyl)borate, triphenylcarbenium tetrakis(perfluorophenyeborate, [Ph$_3$C$^+$][B(C$_6$F$_5$)$_4^-$],

[Me₃NH⁺][B(C₆F₅)₄⁻], (4-(tris(pentafluorophenyeborate)-2,3,5,6-tetrafluorophenyl)pyrrolidinium, tetrakis(pentafluorophenyl)borate, 4-(tris(pentafluorophenyl)borate)-2,3,5,6-tetrafluoropyridine, triphenylcarbenium tetraphenylborate, and triphenylcarbenium tetrakis-(2,3,4,6-tetrafluorophenyl)borate.

29. The process of any of paragraphs 11 to 28 wherein the comonomer comprises one or more C3 to C12 alpha olefin.
30. The process of any of paragraphs 11 to 29 wherein the comonomer comprises propylene.
31. The process of any of paragraphs 11 to 23 wherein the pyridyldiamido transition metal complex is supported.
32. The process of any of paragraphs 1 to 31 wherein the chain transfer agent tri(n-octyl) aluminum or diethyl zinc.

EXPERIMENTAL

Preparation of the following are described in U.S. Ser. No. 61/904,551 filed Nov. 15, 2013: N-[(6-bromopyridin-2-yl)methyl]-2,6-diisopropylaniline, 7-bromoindan-1-ol, 7-bromoindan-1-one, 7-bromo-N-phenyl-2,3-dihydro-1H-inden-1-amine, N-phenyl-7-(4,4,5,5-tetramethyl-1,3,2-dioxaborolan-2-yl)-2,3-dihydro-1H-inden-1-amine, 7-(6-(((2,6-diisopropylphenyl)amino)methyl)pyridin-2-yl)-N-phenyl-2,3-dihydro-1H-inden-1-amine, 8-bromo-1,2,3,4-tetrahydronaphthalen-1-ol, 8-bromo-3,4-dihydronaphthalen-1 (2H)-one, 8-bromo-N-(o-tolyl)-1,2,3,4-tetrahydronaphthalen-1-amine, 8-(4,4,5,5-tetramethyl-1,3,2-dioxaborolan-2-yl)-N-(o-tolyl)-1,2,3,4-tetrahydronaphthalen-1-amine, and 8-(6-(((2,6-diisopropylphenyl)amino)methyl)pyridin-2-yl)-N-phenyl-1,2,3,4-tetrahydrona-phthalen-1-amine Preparation of N-((1-(6-((2,6-Diisopropylphenylamino)methyl)pyridin-2-yl)naphthalen-2-yl)methyl)-2,4,6-trimethylaniline is described in US 2011/030131 OA 1. Preparation of 2,6-diisopropyl-N-{[6-(2-{[(2-methylphenyl)amino]methyl}-1-naphthyl)pyridin-2-yl]methyl}aniline is described in U.S. Ser. No. 14/159,029 filed on Jan. 20, 2014.

Preparation of Complex 1

Toluene (5 mL) was added to 7-(6-(((2,6-diisopropylphenyl)amino)methyl)pyridin-2-yl)-N-phenyl-2,3-dihydro-1H-inden-1-amine (0.296 g, 0.623 mmol) and Hf(NMe₂)₂Cl₂(dme) (0.267 g, 0.623 mmol) to form a clear colorless solution. The mixture was loosely capped with aluminum foil and heated to 95° C. for 3 hours. The mixture was then evaporated to a solid and washed with Et₂O (5 mL) to afford 0.432 g of the presumed (pyridyldiamide) HfCl₂ complex. This was dissolved in CH₂Cl₂ (5 mL) and cooled to −50° C. A Et₂O solution of dimethylmagnesium (3.39 mL, 0.747 mmol) was added dropwise and the mixture was allowed to warm to ambient temperature. After 30 minutes the volatiles were removed by evaporation and the residue was extracted with CH₂Cl₂ (10 mL) and filtered. The solution was concentrated to 2 mL and pentane (4 mL) was added. Cooling to −10° C. overnight afforded colorless crystals that were isolated and dried under reduced pressure. Yield=0.41 g, 92%. ¹H NMR (CD₂Cl₂, 400 MHz): 8.00 (t, 1H), 6.85-7.65 (13H), 5.06 (d, 1H), 4.91 (dd, 1H), 4.50 (d, 1H), 3.68 (sept, 1H), 3.41 (m, 1H), 2.85 (m, 1H), 2.61 (sept, 1H), 2.03 (m, 1H), 1.85 (m, 1H), 1.30 (m, 2H), 1.14 (d, 3H), 1.06 (d, 3H), 0.96 (d, 3H), 0.68 (3, 3H), −0.48 (s, 3H), −0.84 (s, 3H).

Preparation of Complex 2

Toluene (8 mL) was added to N-((1-(6-((2,6-diisopropylphenylamino)methyl)pyridin-2-yl)naphthalen-2-yl)methyl)-2,4,6-trimethylaniline (0.368 g, 0.680 mmol) and Hf(NMe₂)₂Cl₂(dme) (0.291 g, 0.680 mmol) to form a clear orange solution. The mixture was heated to 70° C. in the dark. After 16 hours, white solid had formed as a suspension. The volatiles were evaporated and the solid was suspended in CH₂Cl₂ (10 mL). The solid was collected on a frit and dried under reduced pressure (0.17 g). The CH₂Cl₂ solution was evaporated and Et₂O (10 mL) was added to the residue. The resulting solid was collected on a frit, washed with CH₂Cl₂ (5 mL) and dried under reduced pressure to give 0.26 g of the dichloride complex. The dichloride complex (0.206 g, 0.255 mmol) was combined with CH₂Cl₂ (20 mL) to form a very cloudy solution. At 40° C. Me₂Mg (0.795 mL, 0.255 mmol) in Et₂O was added dropwise over 5 minutes. After stirring for 1 hour, the cold bath was removed and the mixture was allowed to warm to ambient temperature. After 30 minutes, the volatiles were removed by evaporation and the residue was extracted with CH₂Cl₂ (10 mL). Filtration afforded a clear yellow solution that was evaporated to a pale yellow solid that was suspended in pentane (10 mL), collected on a glass frit, and dried under reduced pressure. ¹H NMR spectroscopy indicates the presence of 0.4 equivalents of pentane. Yield: 0.15 g. ¹H NMR (500 MHz, CD₂Cl₂): 8.06-8.11 (m, 2H), 7.96 (d, 1H), 7.77 (d, 1H), 7.67 (d, 2H), 7.46-7.57 (d, 4H), 6.82-7.10 (m, 5H), 5.05 (AB quartet, Δν=158 Hz, J=26 Hz), 4.22 (AB quartet, Δν=296 Hz, J=15 Hz), 3.69 (sept, 1H), 3.03 (sept, 1H), 2.56 (s, 3H), 2.25 (s, 3H), 1.95 (s, 3H), 1.18 (d, 6H), 1.06 (d, 3H), 0.55 (d, 3H), 0.83 (s, 3H), 1.19 (s, 3H).

Preparation of Complex 3

Toluene (50 mL) was added to 2,6-diisopropyl-N-{[6-(2-{[(2-methylphenyl)amino]methyl}-1-naphthyl)pyridin-2-yl]methyl}aniline (2.07 g, 4.03 mmol) and Hf(NMe₂)₂Cl₂(dme) (dme=1,2-dimethoxyethane) (1.73 g, 4.03 mmol) to form a yellow solution. The mixture was heated to 95° C. in the dark. After 2.5 hours, the suspension was cooled to ambient temperature for a couple of hours. The resulting solid was collected on a glass frit and washed with toluene (2×5 mL) and then dried under reduced pressure to afford 2.4 grams of the intermediate dichloride derivative as a white solid. Proton NMR spectroscopy indicated the presence of 0.46 equivalents of toluene. This dichloride derivative (2.40 g, 2.99 mmol) was combined with CH₂Cl₂ (100 mL) and cooled to −40° C. A solution of Me₂Mg (15.3 mL, 3.59 mmol) in Et₂O was added dropwise. After 0.5 hour the mixture was allowed to warm to ambient temperature. The volatiles were then evaporated and the residue was extracted with CH₂Cl₂ and filtered. The volatiles were removed to afford the crude product that was washed with pentane. Drying under reduced pressure afforded product as a white solid (2.01 g, 93.3%). ¹H NMR (400 MHz, CD₂Cl₂): 8.2-6.9 (aryls, 16H), 5.07 (AB quartet, Δν=130 Hz, J=20 Hz), 4.49 (br, 1H), 4.14 (br, 1H), 3.74 (sept, 1H), 3.02 (br sept 1H), 2.30 (br, 3H), 1.4-1.0 (m, 11H), 0.89 (t, 2H), 0.55 (d, 3H), −0.80 (s, 3H), −1.13 (s, 3H).

Ethylene Propylene Polymerizations:

Polymerizations were performed in a stirred 1 L autoclave reactor. Details of polymerization conditions and polymers formed are reported in Tables 1 and 2. All solvents, reactants, and gases were purified by passing through multiple columns containing 3 angstrom molecular sieves and oxygen scavenger. Propylene (50-100 ml), isohexane (600 ml), scavenger (bis(diisobutylaluminum)oxide, 0.1 mmol), diethyl zinc (0.1 to 0.3 mmol) and activator N,N-dimethylanilinium tetrakis (pentafluorophenyl)borate, 1.1 molar equivalent per Hf were added to the reactor and the mixture was heated to the desired temperature. Then the reactor was pressurized with ethylene to approximately 75 psi. After stirring the mixture for several minutes, a solution of complex 1 in toluene (5 ml) was pushed in with ethylene gas at a pressure of 100-125 psi. Polymerization was carried out for 5 minutes before isopropanol (20 ml) was injected to quench the reaction. The reactor was then cooled, depressurized, and opened. The residual volatiles in the product were removed under a stream of nitrogen, followed by heating the sample in a vacuum oven at 60° C.

TABLE 1

| Example | Complex 1 (nmol) | propylene (ml) | ethylene (psi) | ZnEt$_2$ (mmol) | Polym Temp (° C.) | Yield (g) | Productivity (kg/g complex 1) |
|---|---|---|---|---|---|---|---|
| 1 | 2000 | 100 | 100 | 0.1 | 80 | 24 | 17.8 |
| 2 | 4000 | 50 | 100 | 0.1 | 80 | 27 | 9.8 |
| 3 | 4000 | 50 | 100 | 0.1 | 90 | 38 | 14.0 |
| 4 | 2000 | 50 | 100 | 0.1 | 80 | 30 | 21.9 |
| 5 | 1000 | 50 | 100 | 0.2 | 70 | 24 | 35.7 |
| 6 | 1000 | 50 | 125 | 0.2 | 80 | 33 | 49.1 |
| 7 | 1000 | 50 | 100 | 0.3 | 80 | 16 | 24.0 |

TABLE 2

| Ex | mol % C$_2$ (1H NMR) | MI (dg/min) | Mn$_{LS}$ (g/mol) | Mw$_{LS}$ (g/mol) | Mz$_{LS}$ (g/mol) | g'vis | Mn$_{DRI}$ (g/mol) | Mw$_{DRI}$ (g/mol) | Mz$_{DRI}$ (g/mol) | Mw$_{LS}$/Mn$_{DRI}$ (g/mol) |
|---|---|---|---|---|---|---|---|---|---|---|
| 1 | 78.4 | 1.0 | 94,000 | 119000 | 143000 | 1.04 | 87000 | 126000 | 167000 | 1.37 |
| 2 | 68.0 | 0.2 | 157,000 | 206,000 | 245,000 | 1.01 | 127,000 | 205,000 | 282,000 | 1.62 |
| 3 | 72.0 | 3.5 | 71,000 | 90,000 | 105,000 | 0.99 | 62,000 | 94,000 | 123,000 | 1.44 |
| 4 | 70.5 | 0.6 | 123,000 | 155,000 | 183,000 | 1.0 | 103,000 | 159,000 | 212,000 | 1.52 |
| 5 | 87.4 | 8.3 | 60,000 | 66,000 | 71,000 | 1.0 | 56,000 | 70,000 | 83,000 | 1.18 |
| 6 | 81.3 | 4.6 | 70,000 | 79,000 | 87,000 | 0.99 | 64,000 | 82,000 | 97,000 | 1.22 |
| 7 | 86.1 | 93.1 | 28,000 | 32,000 | 36,000 | 1.0 | 28,000 | 35,000 | 41,000 | 1.15 |

Examples 1, 3 and 6 were formulated and tested as viscosity modifiers in lubricants. The samples were blended at 1 wt % concentration (based upon the weight of the final blended solution) with Irganox 1076 and Irgafos 168 in a Group II mineral oil base (ECH50™ base oil). The formulated oils were then tested in a diesel injector equipped shear stability tester according to ASTM D 7109.

Infineum SV™ 140 (formerly known as Shellvis™ 140) is a commercial styrene-diene block copolymer available from Infineum UK Ltd., United Kingdom.

Infineum SV™ 150 (formerly known as Shellvis™ 150) is a commercial styrene-diene block copolymer available from Infineum UK Ltd., United Kingdom.

Infineum SV™ 260 (formerly known as Shellvis™ 260) is a commercial, star shaped styrene-diene polymer available from Infineum UK Ltd., United Kingdom.

Infineum SV™ 300 (formerly known as Shellvis™ 300) is a commercial star shaped styrene-diene polymer available from Infineum UK Ltd., United Kingdom.

ECH50™ base oil is a commercial Group II hydroprocessed base oil available from ExxonMobil Fuels, Lubricants & Specialties Marketing Company.

SSI-90 is Shear Stability Index as determined according to sheared viscosity via diesel injector at 90 cycles, as determined by ASTM D6278 and ASTM D7109 at 90 cycles.

SSI-30 is Shear Stability Index as determined according to sheared viscosity via diesel injector at 30 cycles according to ASTM D6278.

Thickening Efficiency is determined according to ASTM D445.

VI is viscosity index and is determined according to ASTM D 2270.

KV is Kinematic Viscosity as determined by ASTM D 445 (KV40 is determined at 40° C., and KV100 is determined at 100° C.).

TABLE 3

| Component | Shellvis 140 | Shellvis 150 | Shellvis 260 | Shellvis 300 | example 1 | example 3 | example 6 |
|---|---|---|---|---|---|---|---|
| ECH 150 wt % | 98.98 | 98.98 | 98.98 | 98.98 | 98.98 | 98.98 | 98.98 |
| Irganox ™ 1076 wt % | 0.015 | 0.015 | 0.015 | 0.015 | 0.015 | 0.015 | 0.015 |
| Irgafos ™ 168 wt % | 0.005 | 0.005 | 0.005 | 0.005 | 0.005 | 0.005 | 0.005 |
| KV40 cSt | 92.0 | 54.32 | 74.20 | 92.00 | 92.41 | 69.16 | 64.16 |
| KV100 cSt | 15.69 | 10.2 | 12.31 | 14.51 | 14.48 | 11.11 | 11.39 |
| VI | 182 | 179 | 164 | 164 | 163 | 153 | 173 |
| Thickening Efficiency | 3.1 | 1.86 | 2.4 | 2.9 | 2.86 | 2.12 | 2.17 |
| SSI-30 | 45 | 7.7 | 19.2 | 51.3 | 35.9 | 14.6 | 8.1 |
| SSI-90 | 72 | 17.8 | 42.2 | 63.9 | 43.0 | 20.7 | 12.5 |

Note that examples 1, 3 and 6 exhibit very good TE while maintaining a low SSI.

The following test methods are used.

Melt Index was measured by ASTM D 1238 (190° C., 2.16 kg).

$^1$H NMR data was collected at 120° C. in a 5 mm probe using a spectrometer with a $^1$H frequency of 500 MHz. Data was recorded using a maximum pulse width of 45°, 8 seconds between pulses and signal averaging 120 transients. Spectral signals were integrated. Samples were dissolved in deuterated 1,1,2,2,-tetrachloroethane at concentrations of 1-2 wt % prior to being inserted into the spectrometer magnet. Prior to data analysis, spectra were referenced by setting the residual hydrogen-containing solvent resonance to 5.98 ppm.

Size-Exclusion Chromatography (SEC)

Molecular weight (weight-average molecular weight, $M_w$, number-average molecular weight, $M_n$, and molecular weight distribution, $M_w/M_n$ or MWD) are determined using a commercial High Temperature Size Exclusion Chromatograph (e.g., from Waters Corporation or Polymer Laboratories) equipped with three in-line detectors: a differential refractive index detector (DRI), a light scattering (LS) detector, and a viscometer.

The following approach is used for polyolefins. Details not described, including detector calibration, can be found in *Macromolecules* 34, 6812-6820 (2001).

Column set: 3 Polymer Laboratories PLgel 10 mm Mixed-B columns
Flow rate: 0.5 mL/min
Injection volume: 300 μL
Solvent: 1,2,4-trichlorobenzene (TCB), containing 6 g of butylated hydroxy toluene dissolved in 4 liters of Aldrich reagent grade TCB
Temperature: 135° C.

The various transfer lines, columns, DRI detector and viscometer are contained in an oven maintained at 135° C. The TCB solvent is filtered through a 0.7 μm glass pre-filter and subsequently through a 0.1 μm Teflon filter, then degassed with an online degasser before entering the SEC. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/mL at room temperature and 1.324 g/mL at 135° C. Injection concentration range from 1.0 to 2.0 mg/mL, with lower concentrations being used for higher molecular weight samples. Prior to running a set of samples, the DRI detector and injector are purged, the flow rate increased to 0.5 ml/min, and the DRI allowed to stabilize for 8-9 hours; the LS laser is turned on 1 hr before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the same as described below for the light scattering (LS) analysis. Units on parameters throughout this description are such that concentration is expressed in g/mL, molecular weight is expressed in g/mol, and intrinsic viscosity is expressed in dL/g.

The LS detector is a Wyatt Technology High Temperature mini-DAWN. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient [for purposes of this invention, $A_2$=0.0006 for propylene polymers and 0.001 otherwise], $P(\theta)$ is the form factor for a monodisperse random coil, and $K_o$ is the optical constant for the system:

$$K_o = \frac{4\pi^2 n^2 \left(\frac{dn}{dc}\right)^2}{\lambda^4 N_A}$$

where $N_A$ is Avogadro's number, and (dn/dc) is the refractive index increment for the system. The refractive index, n=1.500 for TCB at 135° C. and λ=690 nm. For purposes of this invention and the claims thereto (dn/dc)=0.104 for propylene polymers and 0.1 otherwise.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

The branching index (g'vis) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index g'vis is defined as:

$$g'vis = \frac{[\eta]_{avg}}{kM_v^\alpha}$$

where, for purpose of this invention and claims thereto, α=0.695 for ethylene, propylene, and butene polymers; and k=0.000579 for ethylene polymers, k=0.000262 for propylene polymers, and k=0.000181 for butene polymers. $M_v$ is the viscosity-average molecular weight based on molecular weights determined by LS analysis. The molecular moments are reported as LS or DRI indicating which detector was used to produce the data.

$^{13}$C NMR $^{13}$C NMR data is collected at 120° C. using a spectrometer with a $^{13}$C frequency of at least 75 MHz. A 90 degree pulse, an acquisition time adjusted to give a digital resolution between 0.1 and 0.12 Hz, at least a 10 second pulse acquisition delay time with continuous broadband proton decoupling using swept square wave modulation without gating is employed during the entire acquisition period. The spectra are acquired with time averaging to provide a signal to noise level adequate to measure the signals of interest. Samples are dissolved in deuterated methylene chloride at concentrations between 10 to 15 wt % prior to being inserted into the spectrometer magnet. Prior to data analysis, spectra are referenced by setting the chemical shift of the deuterated methylene chloride solvent signal to 54 ppm.

Differential Scanning Calorimetry (DSC)

Crystallization temperature ($T_c$) and melting temperature (or melting point, $T_m$) are measured using Differential Scanning calorimetry (DSC) on a commercially available instrument (e.g., TA Instruments 2920 DSC). Typically, 6 to 10 mg of molded polymer or plasticized polymer is sealed in an aluminum pan and loaded into the instrument at room temperature. Melting data (first heat) is acquired by heating the sample to at least 30° C. above its melting temperature, typically 220° C. for polyethylene, at a heating rate of 10° C./min. The sample is held for at least 5 minutes at this temperature to destroy its thermal history. Crystallization data are acquired by cooling the sample from the melt to at least 50° C. below the crystallization temperature, typically −100° C. for polyethylene, at a cooling rate of 10° C./min. The sample is held at this temperature for at least 5 minutes, and finally heated at 10° C./min to acquire additional melting data (second heat). The endothermic melting transition (first and second heat) and exothermic crystallization transition are analyzed according to standard procedures. The melting temperatures reported are the peak melting temperatures from the second heat unless otherwise specified.

For polymers displaying multiple peaks, the melting temperature is defined to be the peak melting temperature from the melting trace associated with the largest endothermic calorimetric response (as opposed to the peak occurring at the highest temperature). Likewise, the crystallization temperature is defined to be the peak crystallization temperature from the crystallization trace associated with the largest exothermic calorimetric response (as opposed to the peak occurring at the highest temperature).

Areas under the DSC curve are used to determine the heat of transition (heat of fusion, $H_f$, upon melting or heat of crystallization, $H_c$, upon crystallization), which can be used to calculate the degree of crystallinity (also called the percent crystallinity). The percent crystallinity (X %) is calculated using the formula: [area under the curve (in J/g)/H° (in J/g)]*100, where H° is the ideal heat of fusion for a perfect crystal of the homopolymer of the major monomer component. These values for H° are to be obtained from the *Polymer Handbook, Fourth Edition*, published by John Wiley and Sons, New York 1999, except that a value of 290 J/g is used for H° (polyethylene), a value of 140 J/g is used for H° (polybutene), and a value of 207 J/g is used for H° (polypropylene).

All documents described herein are incorporated by reference herein for purposes of all jurisdictions where such practice is allowed, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A process to polymerize ethylene and one or more C3 to C20 comonomers comprising contacting ethylene, one or more C3 to C20 comonomers, an activator, a chain transfer agent, and a pyridyldiamido transition metal complex represented by the formula: (A), (B), (C), or (D):

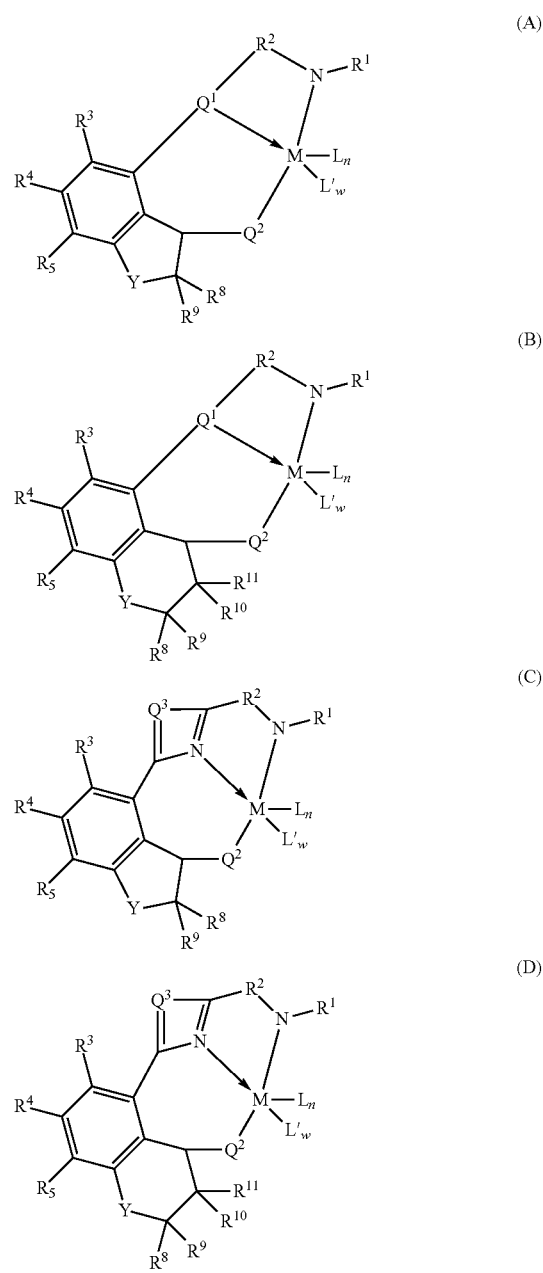

wherein:

M is a Group 3 or 4 metal;

$Q^1$ is a three atom bridge with the central of the three atoms being a group 15 or 16 element (said group 15 element may or may not be substituted with an $R^{30}$ group) represented by the formula: -$G^1$-$G^2$-$G^3$- where $G^2$ is a group 15 or 16 atom (said group 15 element may be substituted with a $R^{30}$ group), $G^1$ and $G^3$ are each a group 14, 15, or 16 atom (each group 14, 15, and 16 element may or may not be substituted with one or more $R^{30}$ groups), where $G^1$, $G^2$ and $G^3$, or $G^1$ and $G^2$, or $G^1$ and $G^3$, or $G^2$ and $G^3$ may form a singular or multi ring system;

each $R^{30}$ group is, independently, hydrogen or a $C_1$ to $C_{100}$ hydrocarbyl group or a silyl group;

$Q^2$ is $-NR^{17}$ or $-PR^{17}$, where $R^{17}$ is selected from hydrocarbyls, substituted hydrocarbyls, silyls, or germyls;

$Q^3$ is -(TT)- or -(TTT)- where each T is carbon or a heteroatom, and said carbon or heteroatom may be unsubstituted or substituted with one or more $R^{30}$ groups that together with the "—C-$Q^3$=C—" fragment, forms a 5- or 6-membered cyclic group or a polycyclic group including the 5 or 6-membered cyclic group;

$R^1$ is selected from the group consisting of hydrocarbyls, substituted hydrocarbyls, and silyl groups;

$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups ($R^3$ & $R^4$ and/or $R^4$ & $R^5$) may be joined to form a substituted or unsubstituted hydrocarbyl or heterocyclic ring, where the ring has 5, 6, 7, or 8 ring atoms and where substitutions on the ring can join to form additional rings;

$R^2$ is -E($R^{12}$)($R^{13}$)— with E being carbon, silicon, or germanium;

Y is selected from oxygen, sulfur, or -E*($R^6$)($R^7$)—, with E* being carbon, silicon, or germanium;

$R^6$, $R^7$, $R^8$, $R^9$, $R^{10}$, $R^{11}$, $R^{12}$, and $R^{13}$ are independently selected from the group consisting of hydrogen, hydrocarbyls, substituted hydrocarbyls, alkoxy, halogen, amino, and silyl, and wherein adjacent R groups ($R^6$ & $R^7$, and/or $R^8$ & $R^9$, and/or $R^9$ & $R^{10}$, and/or $R^{10}$ & $R^{11}$ and/or $R^{12}$ & $R^{13}$) may be joined to form a saturated, substituted or unsubstituted hydrocarbyl or heterocyclic ring, where the ring has 5, 6, 7, or 8 ring carbon atoms and where substitutions on the ring can join to form additional rings;

L is an anionic leaving group, where the L groups may be the same or different and any two L groups may be linked to form a dianionic leaving group;

n is 1 or 2;

L' is a neutral Lewis base; and w is 0, 1, 2, 3 or 4.

2. The process of claim 1, wherein M is Ti, Zr, or Hf.

3. The process of claim 1, wherein $R^2$ is selected from $CH_2$, CH(aryl), CH(2-isopropylphenyl), CH(2,6-dimethylphenyl), CH(2,4-6-trimethylphenyl), CH(alkyl), $CMe_2$, $SiMe_2$, $SiEt_2$, or $SiPh_2$.

4. The process of claim 1, wherein T is C, O, S, or N.

5. The process of claim 1, wherein E and E* are carbon and each $R^6$, $R^7$, $R^{12}$, and $R^{13}$ are a $C_1$ to $C_{30}$ substituted or unsubstituted hydrocarbyl group.

6. The process of claim 1, wherein E and E* are carbon and each $R^6$, $R^7$, $R^{12}$, and $R^{13}$ are a $C_6$ to $C_{30}$ substituted or unsubstituted aryl group.

7. The process of claim 1, wherein $Q^2$ is $-NR^{17}$.

8. The process of claim 1, wherein E and E* are carbon and $R^1$ and $R^{17}$ are independently selected from phenyl groups that are substituted with 0, 1, 2, 3, 4, or 5 substituents selected from the group consisting of F, Cl, Br, I, $CF_3$, $NO_2$, alkoxy, dialkylamino, hydrocarbyl, and substituted hydrocarbyl groups with from one to ten carbons.

9. The process of claim 1, wherein $Q^1$ is selected from:

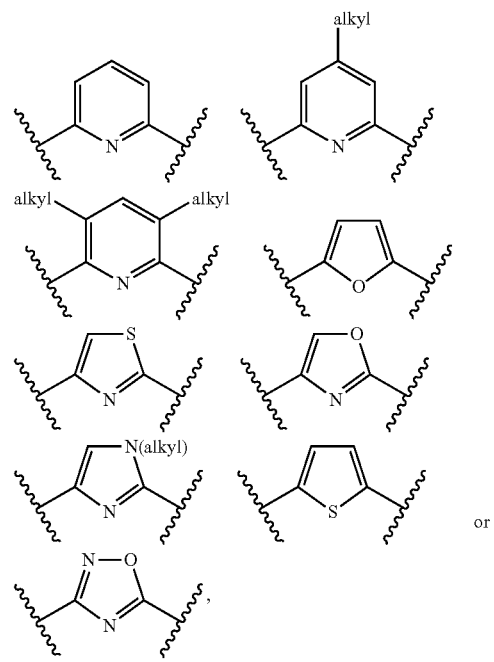

where the

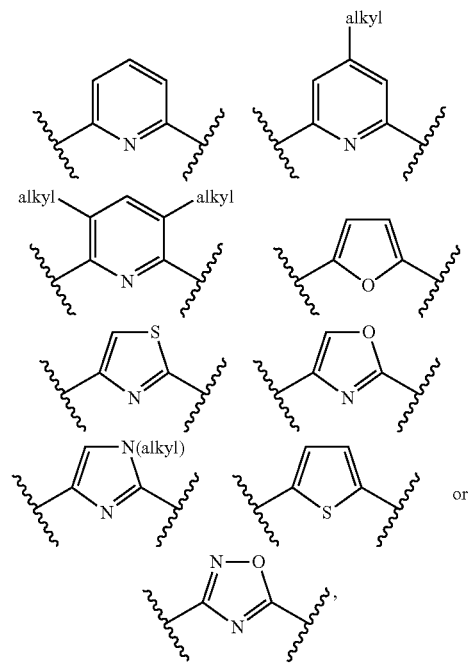

symbols indicate the connections to $R^2$ and the aromatic ring, and alkyl is an alkyl group.

10. The process of claim 1, wherein each L is independently selected from the group consisting of halide, alkyl, aryl, alkoxy, amido, hydrido, phenoxy, hydroxy, silyl, allyl, alkenyl, triflate, alkylsulfonate, arylsulfonate, and alkynyl; and each L' is independently selected from the group consisting of ethers, thio-ethers, amines, nitriles, imines, pyridines, and phosphines.

11. The process of claim 1, wherein $Q^3$ is CHCHCH, $CH_2CH$, CHN(alkyl), CH—S, CHC(alkyl)=CH, C(alkyl) CH=C(alkyl), CH—O, or NO.

12. The process of claim 1, wherein the complex is represented by formula (A).

13. The process of claim 1, wherein the complex is represented by formula (B).

14. The process of claim 1, wherein the complex is represented by formula (C).

15. The process of claim 1, wherein the complex is represented by formula (D).

16. The process of claim 1, wherein the complex is one or more of the compounds represented by the formula:

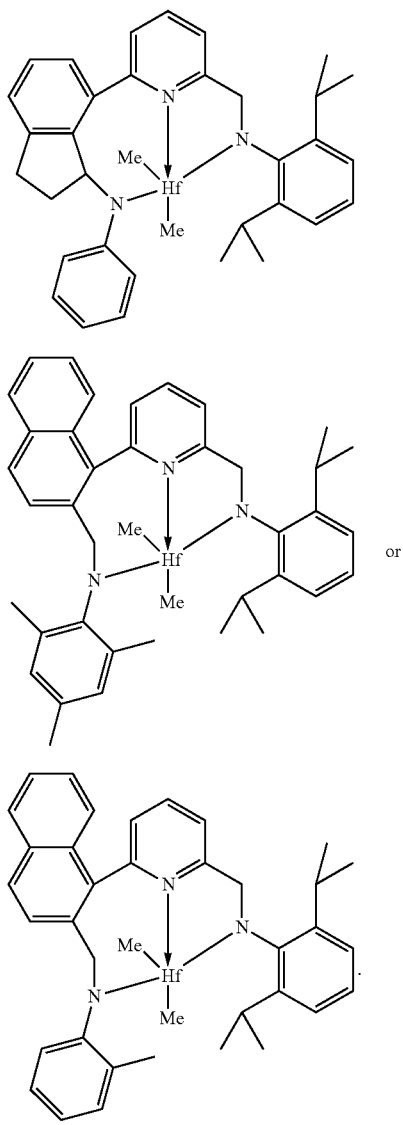

17. The process of claim 1, wherein the activator comprises an alumoxane.

18. The process of claim 1, wherein the activator comprises a non-coordinating anion.

19. The process of claim 1, wherein the activator comprises one or more of:
trimethylammonium tetrakis(perfluoronaphthyl)borate, N,N-dimethylanilinium tetrakis(perfluoronaphthyl)borate, N,N-diethylanilinium tetrakis(perfluoronaphthyl) borate, triphenylcarbenium tetrakis(perfluoronaphthyl) borate, trimethylammonium tetrakis (perfluorobiphenyl)borate, N,N-dimethylanilinium tetrakis(perfluorobiphenyl)borate, triphenylcarbenium tetrakis(perfluorobiphenyl)borate, N,N-dimethylanilinium tetrakis(3,5-bis(trifluoromethyl)phenyl)borate, triphenylcarbenium tetrakis(3,5-bis(trifluoromethyl)phenyl)borate, triphenylcarbenium tetrakis (perfluorophenyl)borate, $[Me_3NH^+][B(C_6F_5)_4]$, 1-(4-(tris(pentafluorophenyl)borate)-2,3,5,6-tetrafluorophenyl)pyrrolidinium, triphenylcarbenium tetraphenylborate, and triphenylcarbenium tetrakis-(2,3,4,6-tetrafluorophenyl)borate.

20. The process of claim 1 wherein the monomer comprises ethylene.

21. The process of claim 1 wherein the monomer comprises propylene.

22. The process of claim 1 wherein the pyridyldiamido transition metal complex is supported.

23. The process of claim 1 wherein the chain transfer agent is dialkyl zinc, trialkyl aluminum, or a mixture thereof.

24. The process of claim 1 wherein the chain transfer agent is one or more of diethylzinc, tri(n-octyl)aluminum, or di(n-propyl)zinc.

25. The process of claim 1 further comprising obtaining an ethylene copolymer having an Mw(LS)/Mn(Dri) of from 1 to 2.5.

26. The process of claim 1 further comprising obtaining an ethylene copolymer having:
1) an Mw(LS)/Mn(Dri) of from 1 to 2.5;
2) an Mw of from 3,000 to 300,000 g/mol;
3) a g'vis of 0.90 or more;
4) an ethylene content of 35 to 85 mol % or more;
5) an C3 to C20 alpha olefin content of 15 to 65 mol %;
6) a ratio of thickening efficiency to shear stability index of 1:3 to 1:20;
7) a melting point (Tm) of 65° C. or less; and
8) a viscosity index of 150 or greater.

27. The process of claim 1 where the polymerization occurs in one or more tubular reactors.

28. The process of claim 1 where the polymerization occurs in one or more continuous stirred tank reactors.

29. The process of claim 1 where the polymerization occurs in one or more semi-continuous batch reactors.

30. The process of claim 1 where the ethylene, the one or more C3 to C20 comonomers, the activator, and the pyridyldiamido transition metal complex are contacted prior to addition of the chain transfer agent.

31. The process of claim 26, where the ethylene copolymer is blended with lubricating oil and the kinematic viscosity at 100° C. of the lubricating oil is increased by at least 50%.

32. A lubricating composition comprising the ethylene copolymer produced by the process of claim 26.

33. A fuel composition comprising the ethylene copolymer produced by the process of claim 26.

34. An ethylene copolymer having:
1) an Mw(LS)/Mn(Dri) of from 1 to 2.5;
2) an Mw (LS) of from 3,000 to 300,000 g/mol;
3) a g'vis of 0.90 or more;
4) an ethylene content of 35 mol % to 85 mol %;
5) a C3 to C20 comonomer(s) content of from 15 to 65 mol %;
6) a ratio of thickening efficiency to shear stability index (30 cycles) of 1:3 to 1:20;
7) a melting point (Tm) of 65° C. or less; and
8) a viscosity index of 150 or greater.

35. The copolymer of claim 34 wherein the ethylene copolymer has a ratio of thickening efficiency to lubricating oil viscosity (KV100) of 2:1 or more, when 1 wt % of the ethylene copolymer is added to a basestock having a KV100 of 10cSt.

36. The copolymer of claim 34, wherein the comonomer(s) are selected from the group consisting of C3 to C20 comonomers.

37. The copolymer of claim 34 wherein the comonomer is propylene.

38. The copolymer of claim 34 wherein
1) the Mw(LS)/Mn(Dri) is 1 to 2.0;
2) the Mw (LS) is 50,000 to 300,000 g/mol;
3) the g'vis is 0.95 or more;
4) the ethylene content of is 60 to 75 mol %;
5) the ratio of thickening efficiency to shear stability index (30 cycles) is 1:4 to 1:18;
6) the viscosity index is 170 or more.

39. The copolymer of claim 34 wherein the copolymer does not increase the color of a lubricant by more than 1 unit, as measured by ASTM 1500, when added to the lubricant at 2 wt %.

40. The copolymer of claim 34, wherein the copolymer has a thickening efficiency of 2.1 or more and the shear stability index at 30 cycles is less than 50.

\* \* \* \* \*